US007075550B2

(12) United States Patent
Bonadio

(10) Patent No.: US 7,075,550 B2
(45) Date of Patent: Jul. 11, 2006

(54) METHOD AND SYSTEM FOR GRAPHICAL FILE MANAGEMENT

(76) Inventor: Allan R. Bonadio, 150 Acalanes Dr. #230, Sunnyvale, CA (US) 94086

( * ) Notice: Subject to any disclaimer, the term of this patent is extended or adjusted under 35 U.S.C. 154(b) by 89 days.

(21) Appl. No.: 10/303,120

(22) Filed: Nov. 22, 2002

(65) Prior Publication Data
US 2003/0156119 A1 Aug. 21, 2003

Related U.S. Application Data

(60) Provisional application No. 60/333,395, filed on Nov. 27, 2001.

(51) Int. Cl.
*G09G 5/02* (2006.01)
*G11B 27/00* (2006.01)
(52) U.S. Cl. ........................ 345/589; 715/772; 715/810
(58) Field of Classification Search ........ 715/810–811, 715/835–839, 772; 345/440, 589, 593, 594, 345/595
See application file for complete search history.

(56) References Cited

U.S. PATENT DOCUMENTS

| 5,065,347 | A | | 11/1991 | Pajak et al. | |
|---|---|---|---|---|---|
| 5,745,714 | A | * | 4/1998 | Glass et al. | 715/788 |
| 5,767,852 | A | * | 6/1998 | Keller et al. | 715/835 |
| 5,797,139 | A | | 8/1998 | Amro et al. | |
| 5,861,885 | A | * | 1/1999 | Strasnick et al. | 715/850 |
| 5,987,469 | A | * | 11/1999 | Lewis et al. | 707/102 |
| 6,020,888 | A | | 2/2000 | Ho et al. | |
| 6,243,089 | B1 | * | 6/2001 | Gong | 715/744 |
| 6,496,208 | B1 | * | 12/2002 | Bernhardt et al. | 715/853 |
| 6,670,974 | B1 | * | 12/2003 | McKnight et al. | 715/855 |
| 6,927,770 | B1 | * | 8/2005 | Ording | 345/440 |
| 2003/0020762 | A1 | * | 1/2003 | Budrys et al. | 345/835 |

* cited by examiner

*Primary Examiner*—Matthew Luu
(74) *Attorney, Agent, or Firm*—Law Office of Alan W. Cannon

(57) ABSTRACT

Systems, methods and computer readable media for graphically identifying properties of files represented on a user interface, such as a computer display. File properties such as file permissions, file ages and relative file sizes may be graphically represented using color encoding of icons in part or in total, color encoding of text associated with icons representative of files, unique icon shapes and relatively sized icons, as well as combinations of these features.

59 Claims, 18 Drawing Sheets

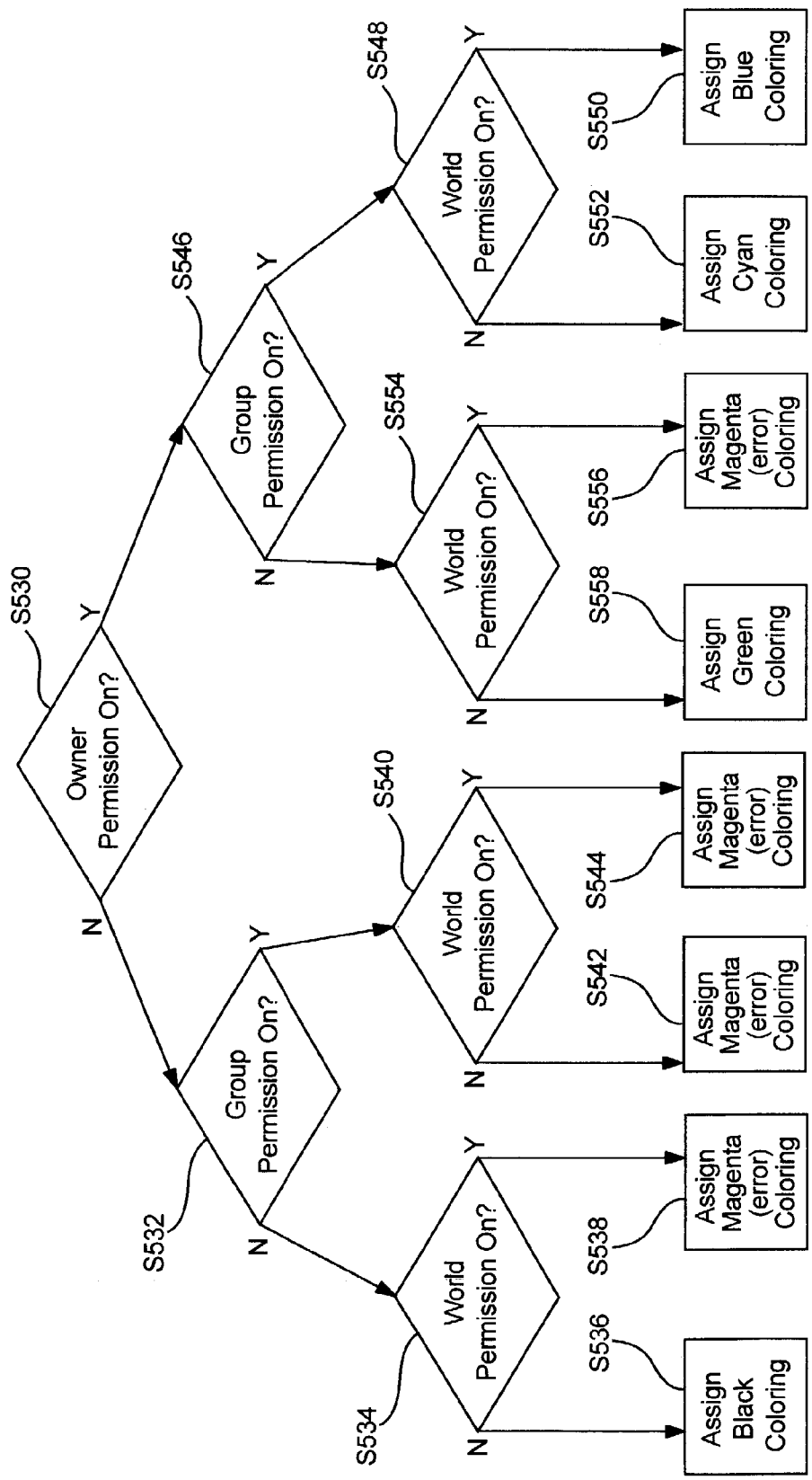

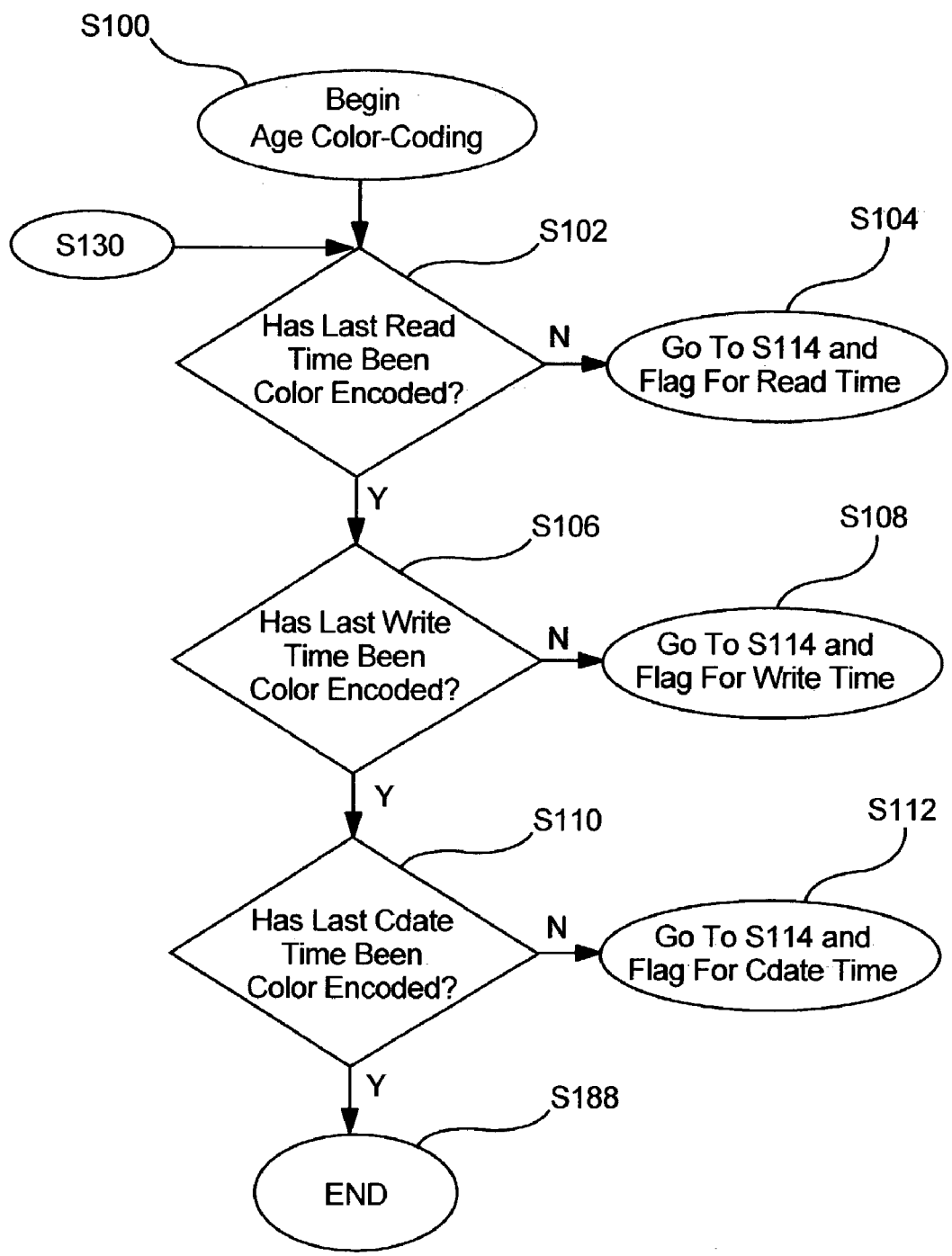

METHOD AND SYSTEM FOR GRAPHICAL FILE MANAGEMENT

RELATED APPLICATIONS

The present application claims priority to U.S. Provisional Patent Application Ser. No. 60/333,395 filed Nov. 27, 2001, the entirety of which is herein incorporated by reference.

TECHNICAL FIELD

The present invention relates to file management programs, graphical user interfaces and operating systems of computer processing systems. More specifically the present invention relates to methods of characterizing files, directories and the like and graphically displaying characteristics of the same.

BACKGROUND OF THE INVENTION

Many conventional computing systems utilize an operating system including a graphical user interface (GUI) to facilitate ease of us of the computing system. Typically a graphical user interface allows a user to graphically view and manipulate the files as icons utilizing an input device such as a mouse or keyboard. Many of these operating systems utilize file managers to organize files stored on computer readable storage media within the computing system. To identify the type of file, e.g. word-processing, graphical, spreadsheet, or other type, the name of each file typically includes an identifier such as a name extension, e.g. "name.exe" to denote an executable file, or "name .jpg" to denote a graphical (picture) file formatted according to a JPEG standard, etc. The GUI will then utilize a look-up table to associate the type of file with a program associated with the identifier and display a predetermined graphical icon. For example, if the identifier indicates that the file is a graphical file, then an icon indicating a graphics program installed on the computer system will be displayed. If the look-up table does not include the identifier then a default graphical icon will be displayed.

File icons were first used on the Xerox Star, which was the first computer to use a graphical interface (GUI). With the adoption of Microsoft Windows® as one of the more popular operating systems for personal computers, depicting file icons by their type has been widely accepted within the industry. Additionally, this practice has spread to other operating systems such as Apple's OS X, Unix and the various graphical user interfaces that have been developed for Linux.

Many times, the icons are too small and/or the resolution of the display on which they are viewed makes it difficult to easily determine the file associations. To address this problem, some GUIs have been adapted so that the file name may be displayed in color, though these are generally limited to a small number of colors. Another attempt to address this problem is disclosed in U.S. Pat. No. 5,797,139 to Amro, wherein it is disclosed that the icons are utilized to display the parent file type while a border disposed about the icon is utilized to identify the type of file, e.g. whether the file is executable, or a graphics file, etc. While this system may be utilized to provide a greater amount of information to a user, e.g. the file type and the parent application, the system still fails to convey other useful information such as the size of the file, when the file was last used/accessed, and who created and/or who has access to the file.

While the '139 patent attempts to include additional information through the use of the graphical user interface, many times a user wishes to know more about the file without having to utilize any other programs. For example, it may be desirable to a system administrator who is performing maintenance on a local area network (LAN) to be able to quickly and efficiently determine when files have been accessed as well as the size of files. This would allow an administrator to remove files that are no longer in use, and to quickly determine ownership of files. This would be further useful at the user level, for example, when a user is attempting to clean up a hard drive or other storage device to free up space, or for other organizational cleanups. By being able to easily identify file sizes, when files were last used, etc., the user can more easily prioritize what is desired to be kept and what may be considered for removal or deletion.

Therefore there is a need for a graphical user interface that will display additional file information such as file size, ownership, when the file was last accessed/used. Such that a user may use this information to maximize the operation of the computer system.

SUMMARY OF THE INVENTION

In accordance with the present invention, methods are provided for graphically displaying file properties (properties of files, directories and the like) on a computer display. One such method involves determining at least one file property of a file to be graphically represented on the display, associating at least one color assignment with the file, and displaying at least a portion of one of text and graphics on the display in the color assigned to graphically indicate the file property to a user. The color assigned is indicative of the file property that is determined, and the text and/or graphics which are colored are indicative of the file of which the property is being displayed.

Examples of file properties which may be displayed by this method include file permissions, such as read permissions, write permissions and execute permissions, and ages of the file, such as time since the file was last read, time since the file was last written to and time since the file was created or had the header changed. Examples of files which may have properties graphically represented include data files, text files, executable files, symlinks, directories, sub-directories, folders, linking files, graphics files, etc.

With regard to permission properties, various categories of users may be defined relative to the permission properties for selective restriction at various permission levels. Examples of such categories include owner, group, world. Additionally, a "superuser" category or status may be available to a system administrator or the like.

When color-encoding for user permissions, a first color may be associated with the file property viewed by an owner or superuser and permitted only to the owner or superuser, a second color may be associated with the file property viewed by an owner or superuser and permitted only to the owner, superuser and group, and a third color may be associated with the file property viewed by an owner or superuser and permitted to the world category. A fourth color may be associated with the file property viewed by a group member other than an owner or superuser and permitted to the group, and a fifth color may be associated with the file property viewed by a group member other than an owner or superuser and not permitted to the group. Still other color associations may be made for other user permission levels.

Another color may be used to indicate an error when an illogical permission scheme has been assigned with regard to a file.

With regard to graphical representations of the ages of files, a color assignment associated with a file property relating to the age of the file may be selected from a plurality of colors, each of the plurality of colors being associated with a different elapsed time interval, and wherein the color assignment associated is the color associated with the elapsed time interval that is nearest the age to be represented. Alternatively, a color assignment associated with a file property relating to the age of the file may be derived from two colors selected from a plurality of colors, each of the plurality of colors being associated with a different elapsed time interval, and wherein the color assignment is accomplished by determining two adjacent time intervals wherein the first of the two adjacent time intervals is less than the age and the second of the two adjacent time intervals is greater than the age, and interpolating between first and second colors associated with the first and second adjacent time intervals, based upon the relative time distance of the age from each of the first and second adjacent time intervals.

More than one file property may be graphically represented with regard to any one file that is indicated on the display. A second color assignment may be made to indicate a second property of the file, the color may be displayed on at least a portion of the graphics or text to graphically indicate the second file property to the user.

The graphics, which may be completely or partially colored by one or more color indicators, may be an icon. For example, a first color may be displayed in an inner portion of the icon, and the second color may be displayed on an outer portion of the icon. Additionally or alternatively, text which is representative of the file of which properties are being graphically displayed may be completely or partially colored to indicate one or more file properties. For example, a first color may be displayed on at least a portion of the icon, and a second color may be displayed on the text. When three properties are graphically displayed, a first color may be displayed in a first portion of the icon, a second color may be displayed in a second portion of the icon and a third color may be displayed in at least a portion of the text.

An icon used to represent the file may be shaped to graphically represent the particular type of file that the icon is associated with.

Further, an icon may be sized proportionately to the relative size of the content of the file or of the depletion of a directory. For example, a method is described to include determining at least one of the content and depletion properties of the file; assigning a size index to the graphics assigned to graphically indicate the relative size of the file; and displaying the graphics in a size indicated by the size index. The graphics may be displayed in a font size the same as the associated text when the file size or depletion is substantially zero.

The size index may be designed to logarithmically scale the relative sizes in which the graphics are to be represented.

In addition to displaying file properties via icon shape and relative icon size, the present system and methods may be used to graphically display one or more further properties by color encoding the icon and/or associated text in a manner described above.

According to the present invention, a method of graphically identifying properties of files is described to include assigning various colors to varying values of a single file property to enable visual differentiation among the varying values; and displaying at least a portion of at least one of an icon and a textual display which is representative of a file, on a display in an assigned color indicate of the value of the file property being displayed.

Such a method may further include assigning various colors to varying values of a second file property to be displayed on the at least a portion of at least one of an icon and textual display; selecting one of the first or second file properties to be displayed; and displaying the assigned color of the file property to be displayed on the at least a portion of at least one of the icon and textual display.

According to the present invention, a method of graphically identifying properties of files includes assigning an icon shape to an icon to be displayed to identify the file, wherein the icon shape graphically indicates the type of file being represented, assigning a size index to the icon to display the icon in relative size indicative of the relative size of the file being represented, and displaying the icon in the assigned shape and size.

Further, the method may include assigning at least one color to the icon which is indicative of another property of the file and displaying the at least one color on at least a portion of the icon.

A textual identifier of the file may be displayed along with the display of the icon, and at least one color may be assigned at least one of the icon and textual identifier, and displayed.

A system for graphically representing properties of files, directories and the like on a computer display is disclosed to include means for determining at least one file property of a file to be graphically represented on the display; means for associating at least one color assignment with the file, the color assigned being indicative of the file property that is determined; and means for displaying at least a portion of one of text and graphics on the display in the color assigned to graphically indicate the file property to a user, wherein the at least one of text and graphics are indicative of the file the property of which is being displayed.

Examples of file properties to be displayed include permissions and ages of the file.

The system may choose from a plurality of colors associated with distinct ages to be represented, and assign a color assignment associated with a file property relating to the age of the file, wherein the color assignment associated is the color associated with the elapsed time interval that is nearest the age to be represented.

Alternatively, the system may assign a color relating to the age of the file by deriving the color from two colors selected from a plurality of colors, each of the plurality of colors being associated with a different elapsed time interval, and wherein the color assignment is accomplished by determining two adjacent time intervals wherein the first of the two adjacent time intervals is less than the age and the second of the two adjacent time intervals is greater than the age, and interpolating between first and second colors associated with the first and second adjacent time intervals, based upon the relative time distance of the age from each of the first and second adjacent time intervals.

The system may further include means for determining at least a second file property of the file to be graphically represented on the display, and means for associating a second color assignment with the file, the second color assigned being indicative of the second file property that is determined, wherein said means for displaying displays the second color on at least a portion of the graphics or text to graphically indicate the second file property to the user.

The means for displaying may display the graphics in the form of an icon, with the first color being displayed on a first portion of the icon, and the second color being displayed on a second portion of the icon. As one alternative, the first color may be displayed on at least a portion of the icon, and the second color may be displayed on text associated with the icon. Still further, three or more file properties may be graphically displayed by the system.

A system according to the present invention may additionally or alternatively include means for determining at least one of the content and depletion properties of the file, and means for assigning a size index to the graphics assigned to graphically indicate the relative size of the file. The means for displaying displays the graphics in a size indicated by the size index.

A computer readable medium carrying one or more sequences of instructions for graphically representing properties of files, directories and the like on a computer display is provided, wherein execution of the one or more sequences of instructions by one or more processors causes the one or more processors to perform the steps of determining at least one file property of a file to be graphically represented on the display, determining and assigning a size index to graphics to be graphically displayed to the file property, and displaying the graphics in a size determined by the size index.

The computer readable medium may further include instructions for carrying out the additional steps of determining at least a second file property of the file to be graphically represented on the display, associating at least one color assignment with the file, the color assigned being indicative of the at least a second file property that is determined, and displaying at least a portion of one of text and graphics on the display in the color assigned to graphically indicate the file property to a user, wherein the text and graphics are indicative of the file the properties of which are being displayed.

Still further, at least a third file property may be determined by executing instructions of the computer readable medium, and then associating a second color assignment with the file, the second color assigned being indicative of the third file property that is determined, and displaying the third color on at least a portion of the graphics or text to graphically indicate the third file property to the user. Additional properties may be similarly displayed.

A computer readable medium carrying one or more sequences of instructions for graphically identifying properties of files is disclosed, wherein execution of the one or more sequences of instructions by one or more processors causes the one or more processors to perform the steps of: assigning various colors to varying values of a single file property to enable visual differentiation among the varying values; and displaying at least a portion of at least one of an icon and a textual display which is representative of a file, on a display in an assigned color indicate of the value of the file property being displayed.

Further, various colors may be assigned to varying values of a second file property to be displayed on at least a portion of at least one of an icon and textual display, and further execution may result in selecting one of the first or second file properties to be displayed; and displaying the assigned color of the file property to be displayed on at least a portion of at least one of the icon and textual display.

A computer readable medium carrying one or more sequences of instructions for graphically identifying properties of files is disclosed, wherein execution of the one or more sequences of instructions by one or more processors causes the one or more processors to perform the steps of: assigning an icon shape to an icon to be displayed to identify the file, wherein the icon shape graphically indicates the type of file being represented; assigning a size index to the icon to display the icon in relative size indicative of the relative size of the file being represented; and displaying the icon in the assigned shape and size.

Additionally, the computer readable medium may include instructions for assigning at least one color to the icon which is indicative of another property of the file; and displaying the at least one color on at least a portion of the icon.

A textual identifier of the file may be displayed along with the display of the icon, wherein at least one color may be assigned to at least one of the icon and textual identifier which is indicative of another property of the file and displayed on at least a portion of the at least one of the icon and textual identifier.

BRIEF DESCRIPTION OF THE FIGURES

A more complete understanding of the present invention may be obtained by referring to the following detailed description together with the accompanying drawings briefly described hereinafter.

FIGS. 6A–6D diagrammatically illustrate another example of subroutines for a process by which the present invention assigns color-coding to indicate permission statuses according to the present invention.

FIGS. 7A–7D diagrammatically illustrate an example of a process by which the present invention assigns color-coding to icons and/or file names to indicate age statuses of the files associated therewith.

DETAILED DESCRIPTION OF THE PREFERRED EMBODIMENTS

Figure 1:
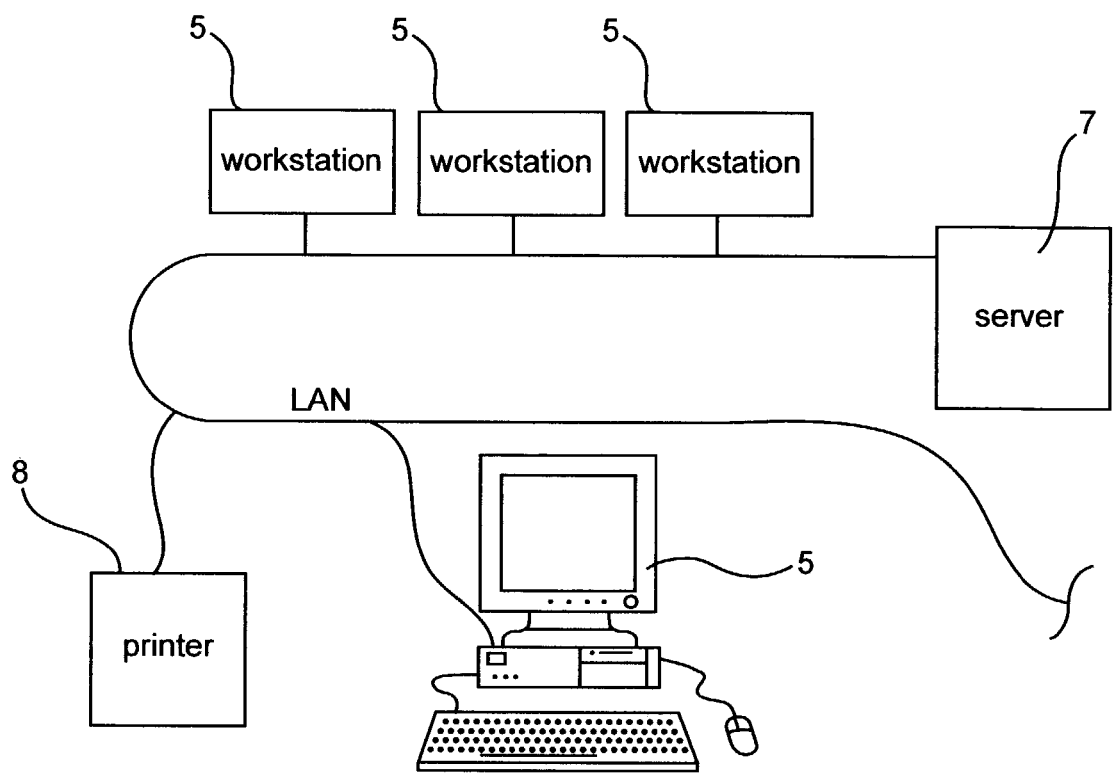
FIG. 1 is a schematic view of an exemplary embodiment of a local area network (LAN).

Before the present invention is described in such detail, it is to be understood that this invention is not limited to particular variations set forth herein as various changes or modifications may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "and," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Definitions

The term "depletion" refers to an amount of a disk or other storage medium consumed for a file or directory and is sometimes given in units of blocks (e.g., for a disk, such as a hard drive). Deletion of a file or directory frees up space equal to its depletion. Duplicating a file or directory consumes space equal to its depletion. A disk or other storage medium is full when the sum of the depletions of all of its files and directories reaches its capacity.

The term "content" is used to refer to the actual number of bytes that a file contains. For example, a 5 byte file would have 5 bytes of content, but the depletion resulting from this same file might be 512 bytes, 1 k bytes, 32 k bytes, or whatever the "depletion block size" of the storage medium is for the storage medium upon which the file is stored.

Referring now to FIG. 1, there is shown an exemplary embodiment of a local area network (LAN) in accordance with the present invention. A number of workstations or personal computers 5 may be connected to the LAN. Additionally, one or more network file servers 7 may be connected to the LAN as well as one or more printers 8. The network file server 7 is configured to be accessible by any of the workstations or personal computers that are connected to the LAN, thus, each of the workstations or personal computers can read/write files to and from the file server 7, wherein the files may be shared by multiple users accessing the system. Further still, the LAN may allow a user to access the network through an internet connection or a dial-in connection.

Figure 2:
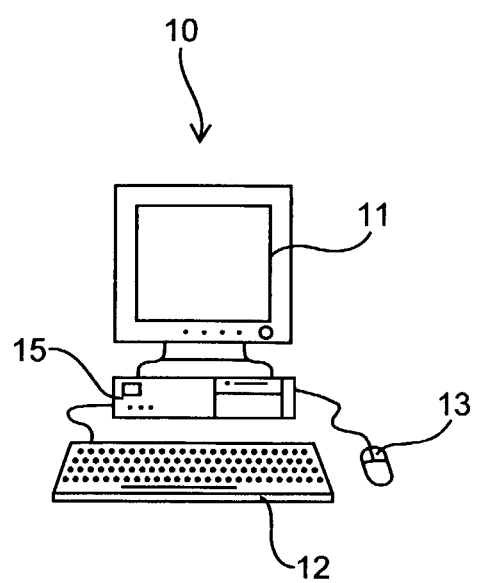
FIG. 2 is a schematic view of a personal computer for use in accordance with the present invention.

Referring now to FIG. 2, there is shown an exemplary embodiment of a personal computer in accordance with the present invention. As shown in FIG. 2, the personal computer 10 includes a display device 11, user input devices 12, 13, and a processing unit 15. The processing unit 15 may further include a central processing unit, memory, display adapter, connections for the user input devices, and other input devices such as internal or external disk drives, floppy drives, cdrom drives, DVD drives, etc. As shown, the user input devices 12, 13 may be embodied in the form of a keyboard 12 and a mouse 13. Wherein, the personal computer 10 further includes a graphical operating system contained within the memory, the keyboard 12 and the mouse 13 are utilized to control the graphical operating system. It shall be understood that the personal computer 10 as shown in FIG. 2 and described herein is merely exemplary and should not be considered limiting in any manner. Further still, the graphical operating system may comprise Windows®, MacOS-X®, BeOs®, Linux®, Unix®, or similar graphical operating system programs. The graphical operating system is configured to display icons on the display, wherein the icons are intended to represent various programs, directories, files and the like installed within the memory of the personal computer.

Movement of the mouse 13 correlates to movement of a cursor displayed on the display device. The user may position the cursor over an icon on the screen and by pressing and releasing (i.e., "clicking") buttons on the mouse, input commands. For example, by "left clicking" on an icon, a program may be started or initiated; by "right clicking" on the icon, a menu of commands may be displayed, as well as display options.

Figure 3:
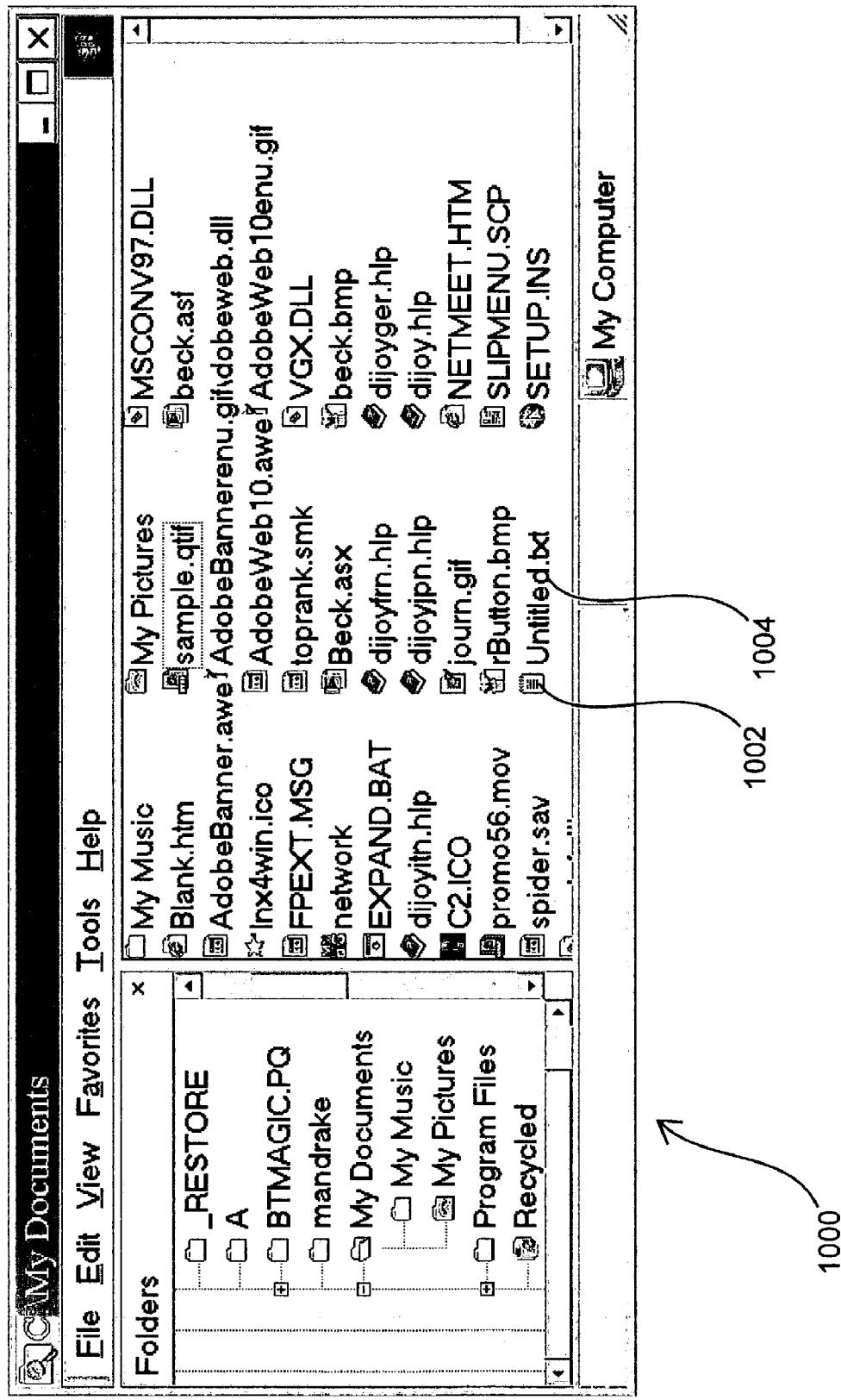
FIG. 3 is a schematic view of a prior art graphical user interface displaying icons employed thereby.

Referring now to FIG. 3, there is shown a GUI illustrating a prior art file management system 1000. The prior art file management system 1000 utilizes a unique bitmap file for identifying files belonging to specific applications. Thus, a user can look at the icon 1002 displayed next to each file name 1004 to determine which program is associated with that file. The bitmap icon is assigned to each file name using a look-up table of associations for the files. Although the icon 1002 illustrates the file's association, it does not convey information such as the period of time that has elapsed since the file was last accessed, the physical size of the file, or who may access the file. In order to view information such as this, the user must open additional windows for each individual file.

Figure 4:
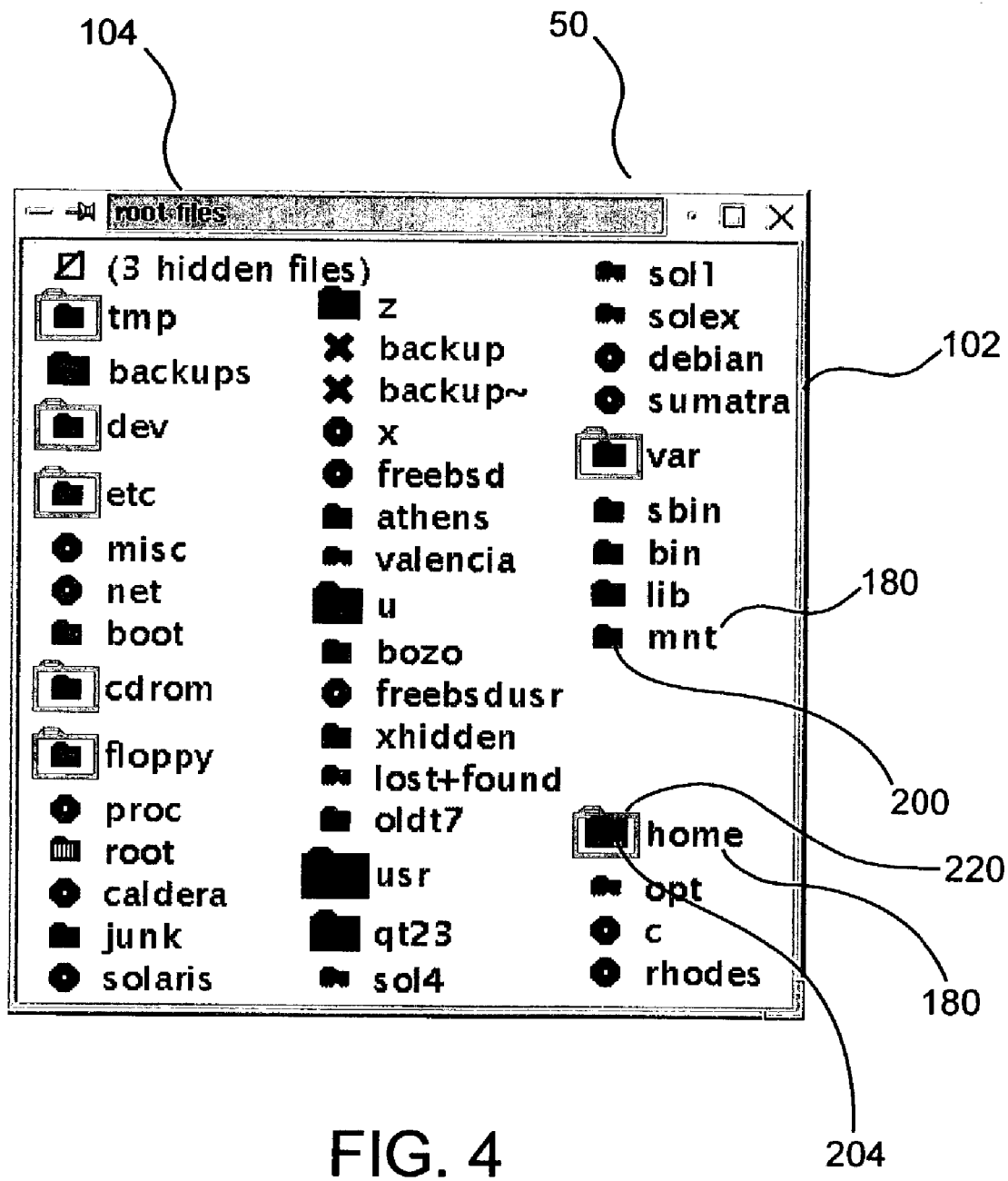
FIG. 4 is a schematic view of a graphical user interface illustrating a display of icons in accordance with the present invention.

Referring now to FIG. 4, there is shown an exemplary embodiment of a graphical user interface 50, wherein a file manager program in accordance with the present invention is shown. A file manager program according to the present invention is configured for displaying file names 180 and associated icons 200 within a window 102, wherein an icon 200 is displayed adjacent to the name 180 of the file, folder, directory, or the like, respectively. The icons 200 may or not may have unique graphical configurations, may be displayed having various colors, and may be differentially sized, as well. Colors may be associated with the icon 200, as well as the textual name 180 of the file, directory, folder, etc. Further, the icons 200 may be differentially colored to convey more than one property of the file to the user. Thus, graphical shapes, relative sizes and colors of the icons, as well as colors of the file name can be used to convey properties of the file, directory, folder, or the like to the viewer of the display 102.

Window 102 may further include a header 104, wherein the header 104 indicates the location of the files displayed within the window 102. In the present example, the header 104 indicates that the location of the files displayed in the window 102 are located in the root directory of the computer. The files displayed within the window 102 may be changed by directing the file manager to show files stored at a different memory location. Typically this is done utilizing a pull-down menu located within the header (not shown), or "right clicking" within the window area and selecting a different location.

Colors

The icons in accordance with the present invention may include at least one color to convey information about the file, directory, folder, etc. (hereinafter, referred to generally as "file"), that it represents. The use of color, attaches visual attributes to the properties of the files. One coloring scheme of the present invention is used to indicate permission statuses of the files represented in the display. In one example of a file management system according to the present invention, three categories of permissions are defined: owner, group, and world. It is to be noted however, that the present invention is not limited to three categories of permissions, or to the specific categories noted above, as color-encoding for permission statuses applies broadly to any categorization scheme of users which may be defined. An "owner" refers to a user who created, or otherwise inputted a file into the system. A "group" is a specified set of users that may be given permission to read, write to, or execute a file, and the category "world" refers to all users who can access the system. Another type of user, which is not specifically categorized, may be referred to as a "superuser", which would include a system manager or system administrator, for example. A superuser may be allowed to override the permission rules that are assigned to a file. Each user is a member of the world category, and also may be assigned to multiple groups. When a user logs into the system, that particular user will have access to files permitted to that particular user, files permitted to any group that that particular user has been assigned, and files permitted to the world category.

In addition to the categories of users that may be given permissions to a file, color-encoding is further used to indicate the type of access that a user or category of users may be given permission to. The types of access may include "read", "write" and "execute", for example. Even superusers may not have all permissions to all files. For example, if the file represents a network volume, the permissions cannot be overridden. As another example, if the file represents a CD, no one can write to it, including superusers.

Figure 5A:
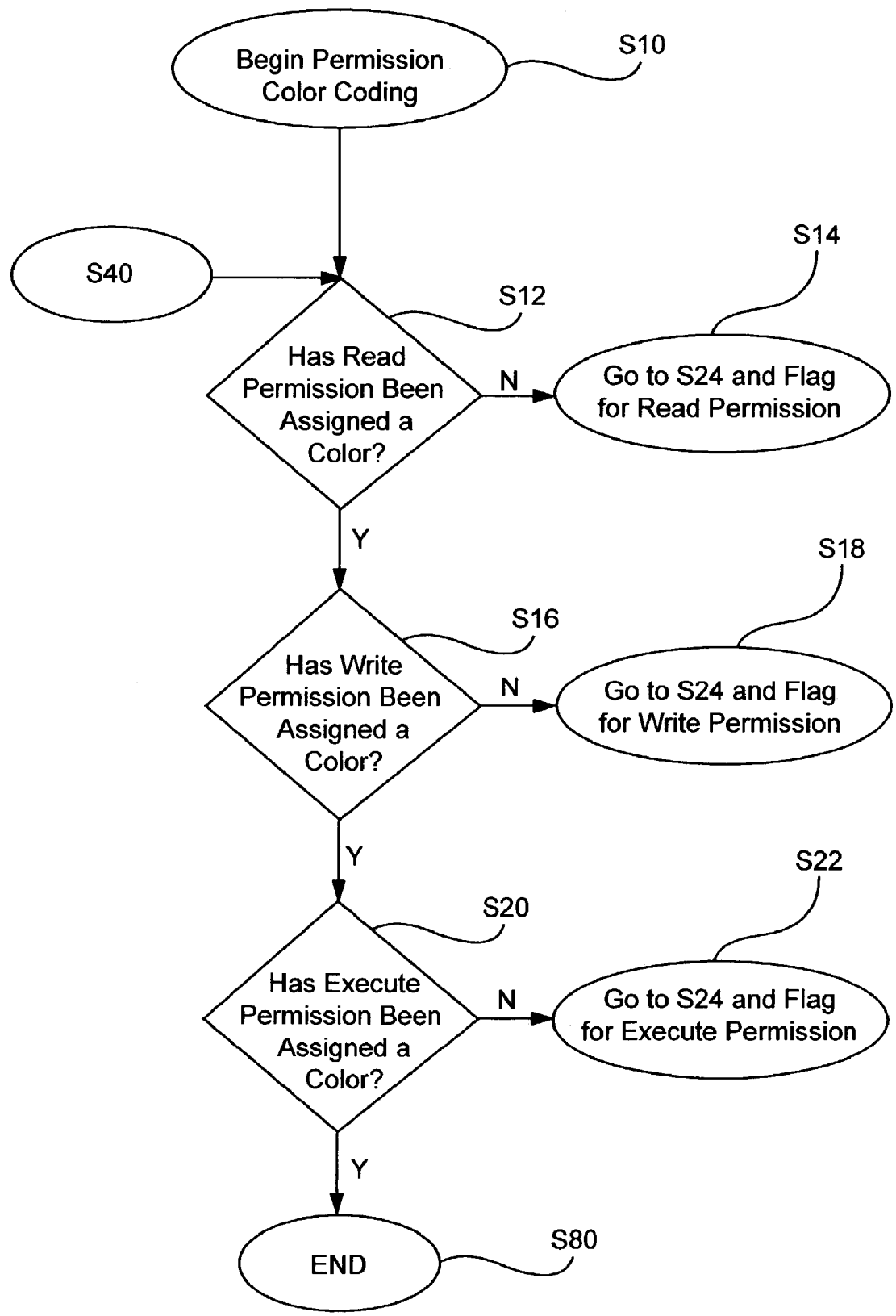
FIGS. 5A–5B diagrammatically illustrate an example of a process by which the present invention assigns color-coding to icons and/or file names to indicate permission statuses of the files associated therewith.
Figure 5B:
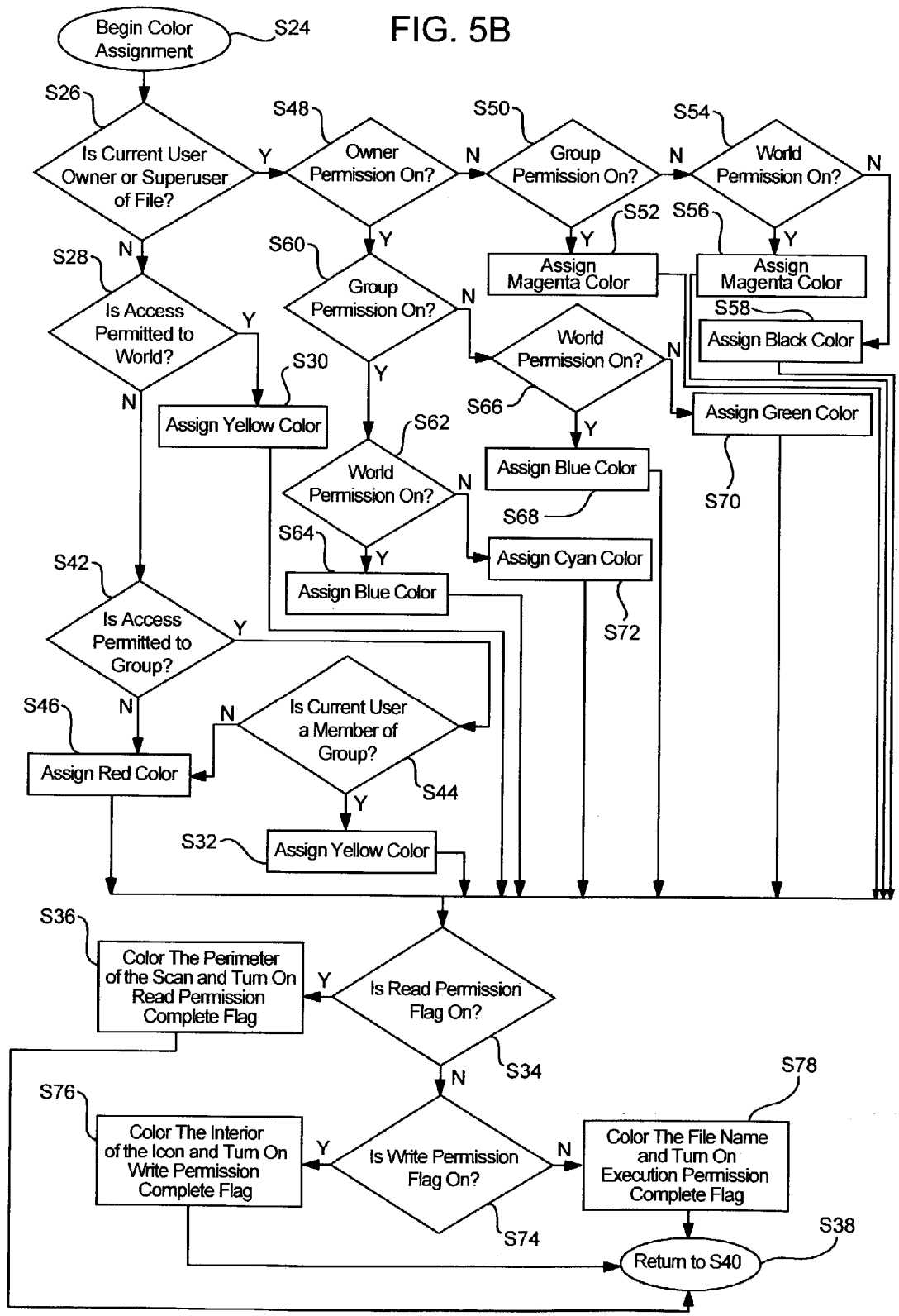

FIGS. 5A–5B diagrammatically illustrate an example of a process by which the present invention assigns color-coding to icons 200 and file names 180 to indicate permission statuses of the files associated with such icons 200 and file names 180. The process begins at step S10 where the file attributes regarding permission levels are read, as a basis for color-encoding the components to graphically display the permission levels on the GUI. At step S12 it is determined whether the system has already assigned the "read permission" status of the file. The read permission status will indicate which categories of users, if any, have permission to read the file. If read permission status has not yet been color-encoded, the process is instructed at S14 to turn on a flag that read permission processing is proceeding and to proceed to step S24. At step S24, the color assignment process begins and at step S26, it is determined whether the user for which the color assignment is being made is the owner of the file or a superuser of the file. If the user is not the owner or a superuser, processing proceeds to step S28, wherein it is determined whether the world category has permission to read the file. If the world level category has permission to read the file, processing goes to step S30, where the color yellow is assigned. Next, when it is determined, in this instance, at step S34 that the read permissions flag is on, the assigned color is applied to the perimeter, or outer portion of the icon associated with the file, which, when displayed, will indicate to the user that he has permission to read the file. It should be noted here, that the present example assigns colors to the outer portion, or perimeter, of the icon to indicate read permission status, colors the interior of the icon to indicate write permission status, and colors the textual name or file name associated with the icon to indicate execute permission status. However, the present invention is not limited to this scheme, as other arrangements could be assigned. As one example, the write permission status could be indicated by the coloring of the perimeter of the icon, and so forth. Nor do the divisions in coloring of the icon limit the invention, as the icon could be differentially colored between the top half and bottom half, for example, to indicate different permission statuses. Still further, the particular color assignments are not to be considered limiting. Although the color assignments have been chosen according to what the inventor believes is an intuitive scheme, certainly other color assignments could be made, so long as they are readily visually differentiable from one another.

After application of the color to the perimeter of the icon at step S36, a "read permission completed" flag is turned on, the read permissions flag is turned off, and processing is returned at step S38 to step S40. Step S40 returns the processing to step S12, where it will now be determined by the reading of the read permission completed flag that read permission has been assigned a color. Returning back to step S28 in the previous description regarding color-encoding read permission, if it is determined that the file does not have world read permission, then it is determined whether or not any group read permissions have been assigned to the file at step S42. If any group permissions have been assigned, processing goes to step S44 to determine whether the user is a member of any group that has permission. If the user is determined to be a member of at least one group that has read permission to the file, then the color yellow is assigned at step S32 and processing continues to step S34 and on, as described above. As soon as it is determined that the user belongs to one group that has read permission, the processing proceeds to step S32, as that is all that is required to assign the yellow color. If it is determined at step S44 that the user is not a member of any group or groups that have read permission to the file, then the color red is assigned at step S46. The same process step is taken when it is determined at step S42 that no group access is provided to the file. From step S46, processing goes to step S34 and then to S36, in this instance for application of the color red to the perimeter of the icon. Processing then returns to step S40 via step S38, as described above.

Again returning back into the read permission processing steps described above, if it is determined at step S26, that the current user is an owner or superuser of the file, then a determination is made as to whether permission is allowed the owner at step S48. If owner permission has not been assigned, processing proceeds to step S50 where it is determined if group permission has been assigned. Group permission should never be allowed when owner permission is not allowed, so if it is determined that group permission is allowed in this instance, the color magenta is assigned at step S52. The color magenta is used in this example as and indicator of an error, such as here, where the assignment logic does not make sense. Processing then goes to step S34 where it is determined that the read permission flag is on at this stage, and the perimeter of the icon is colored magenta in this instance, which will indicate to the owner or administrator that there is a problem with the read permission assignment of this particular file.

If, at step S50, it is determined that no group permission exists, then at step S54, it is determined as to whether world permission has been assigned. If world permission is assigned in this instance, this is again a nonsensical result, and the color magenta is assigned at step S56, after which processing proceeds as described above after processing at step S52. If it is determined at step S54 that world permission has not been assigned, then the color black is assigned at step S58, after which processing continues to steps S34 and S36, and the perimeter of the icon is colored black to indicate to the owner or superuser that no read permission of this particular file exists.

Going back to step S48, if it is determined there that the file does have owner permission, then, at step S60, it is determined whether any group permissions have been assigned. If one or more group permissions have been assigned, processing goes to step S62 to determine whether world permission has been assigned. If it is determined that world permission has been assigned, then the color blue is assigned at step S64, and processing goes to steps S34 and S36 to color the perimeter of the icon 200 blue, which will indicate to the owner or superuser that all users (i.e., world permission) are permitted to read this file. If it is determined at step S60 that no group permissions have been assigned, then processing goes to step S66 where it is determined whether world permission has been assigned. Since there is no requirement that a particular group have permission to allow broad world permission, it is not illogical to have world permission on without having any group permissions on, and blue is assigned at step S68 in this instance. If no world permission is found to exist at step S66, then the color green is assigned at step S70, and by coloring the perimeter of the icon green after processing through steps S34 and S36, this will indicate to the owner or superuser that the file only has owner read permission.

If it is determined at step S62 that world permission has not been assigned, then the color cyan is assigned at step S72, and by coloring the perimeter of the icon cyan after processing through steps S34 and S36, this will indicate to the owner or superuser that the file only has owner and at least one group read permission.

After coloring the perimeter of the icon at step S36, setting the read permission completed flag, turning off the read permissions flag, and returning to step S12 via steps S38 and S40 as described above, it is determined by the presence of the read permission completed flag at step S12 that read permission has already been assigned. Processing then goes to step S16 to determine whether write permission has been assigned a color. Since, in this instance, write permission has not yet been assigned a color, processing goes to step S18, where the write permissions flag is turned on, and then processing goes to step S24 for color assignment. Color assignment processing for write permission goes on in the same manner as described above with regard to read permission color processing, except that this time the file attributes with regard to write permissions are compared and considered in the processing steps. After assignment of a color along any of the previously described paths, it will be determined at step S34, in this instance, that the read permissions flag has been turned off. At step S74, when it is determined that the write permissions flag has been turned on, processing then goes to step S76, where the assigned color is applied to the interior of the icon to indicate the status of write permissions. A "write permissions completed" flag is turned on and the write permissions flag is turned off.

Again returning to step S12 via steps S38 and S40, it is again determined at step S12, that read permission has been assigned a color, by the presence of the read permissions completed flag. Moving to step S16, it is also determined that write permission has been assigned a color, by the presence of the write permissions completed flag. Processing then goes to step S20 where it is determined that execute permission has not yet been assigned a color. Processing then goes to step S22, where the execute permissions flag is turned on, and then processing goes to step S24 for color assignment. Color assignment processing for execute permission goes on in the same manner as described above with regard to read and write permission color processing, except that this time the file attributes with regard to execute permissions are compared and considered in the processing steps. After assignment of a color along any of the previously described paths, it will be determined at step S34, in this instance, that the read permissions flag has been turned off, and at step S74 that the write permissions flag has been turned off. Processing then proceeds to step S78, where the assigned color is applied to the file name associated with the icon to indicate the status of execute permissions. An "execute permissions completed" flag is turned on and the execute permissions flag is turned off, after which processing returns to step S12 via steps S38 and S40. After determination that each of read, write and execute permission coloring has been performed at steps S12, S16 and S20, respectively, all flags are reset (turned off) and the processing ends for that particular file (step S80). The same procedures are repeated for each icon and file name to be color encoded.

By this process, the present invention provides a visual display on a GUI which readily identifies read, write and execute permission statuses of the files displayed to a user, without having to resort to the opening of any further files, envelopes or without further processing of the icons. The user can immediately identify which files are available for reading, writing or execution by the yellow coloring in the appropriate location (perimeter of icon, interior of icon, or file name, respectively). Similarly, an owner or administrator (superuser) can visualize what levels of permissions are allowed for each file merely by viewing the display of the colored icons and filenames on the GUI.

FIGS. 6A–6D diagrammatically illustrate another example of subroutines for a process by which the present invention assigns color-coding to icons 200 and file names 180 to indicate permission statuses of the files associated with such icons 200 and file names 180. The process begins at step S510 where the file attributes regarding permission levels are read, as a basis for color-encoding the components to graphically display the permission levels on the GUI. At step S512, the value for coloring the perimeter (Perimeter-Coloring) of the icon is set equal to the permission color for "read permission" (PermissionColor (ReadPermission)). At step S514, the value for coloring the interior (InternalColoring) of the icon is set equal to the permission color for "write permission" (PermissionColor (WritePermission)). At step S516, the value for coloring the textual name 180 associated with the file and displayed with the icon 200 (NameColoring) is set equal to the permission color for "execute permission" (PermissionColor (ExecutePermission)).

Figure 6A:
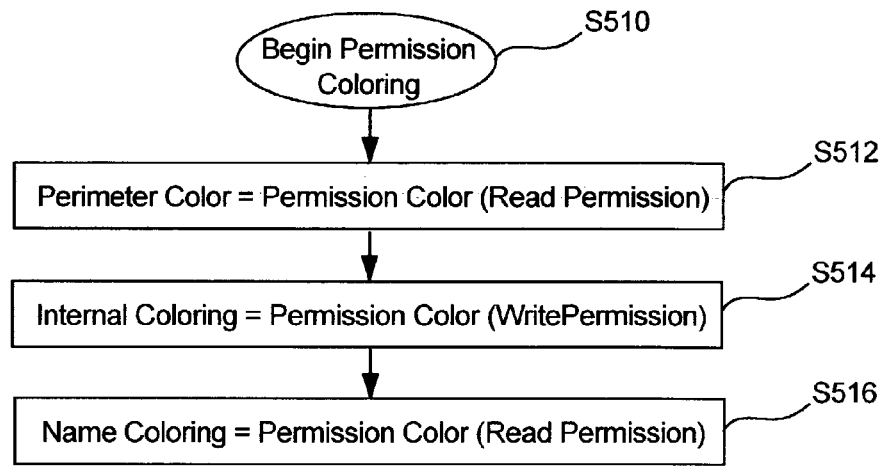
Figure 6B:
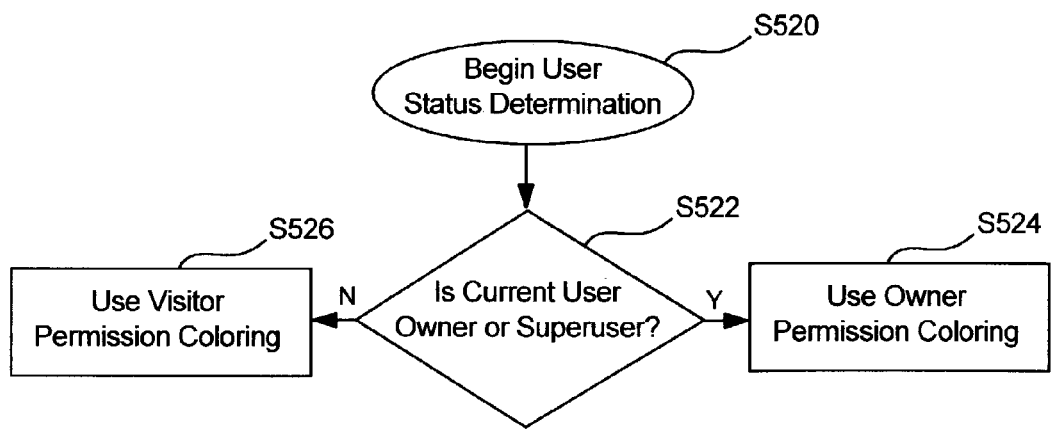

In FIG. 6B, a subroutine for determining whether to use owner coloring or visitor coloring is shown. At step S520, the user status determination subroutine begins and at step S522, a determination is made as to whether the current user is the owner or superuser of the file being considered. If it is determined that the current user is the owner or a superuser, then owner permission coloring will be used as indicated at step S524, wherein the owner permission coloring subroutine will be run. If, on the other hand, the current user is determined not to be the owner or a superuser, then the visitor permission subroutine will be used, as indicated at step S526.

FIG. 6C shows a subroutine for applying an owner permission scheme of colors to the icon(s)/textual name(s) associated with files owned by the user or of which the user is of superuser status. At step S530, a determination is made as to whether owner permission status pertains. If the user is not the owner or superuser of the file, then a further determination is made as to whether the file has been assigned group permission at step S532. If it is determined at step S532 that group permission has not been assigned, another determination is made regarding world permission at step S534. If world permission has not been assigned, then the color black is assigned at step S536. If neither owner permission (step S530) nor group permission (step S532) is assigned, but world permission is (step S534), then the magenta color is assigned at step S538, indicating that an error has been made in the permission assignments. The same occurs (see steps S542 and S544) when there is no owner permission but there is group permission, whether or not there is world permission (step S540).

If there is owner permission at step S530 and group and world permissions are also both granted (steps S546 and S548, respectively), then the blue color is assigned at step S550. If owner and group permissions are assigned, but world permission is not, then the cyan color is assigned at step S552. If the owner permission is granted at step S530, but group permission is not granted at step S546, and world permission is not granted at step S554, then the green color is assigned at step S558. However, if world permission is granted at step S558, then the magenta color is assigned at step S556 to indicate that an error has been made in the permissions assignments.

Figure 6D:
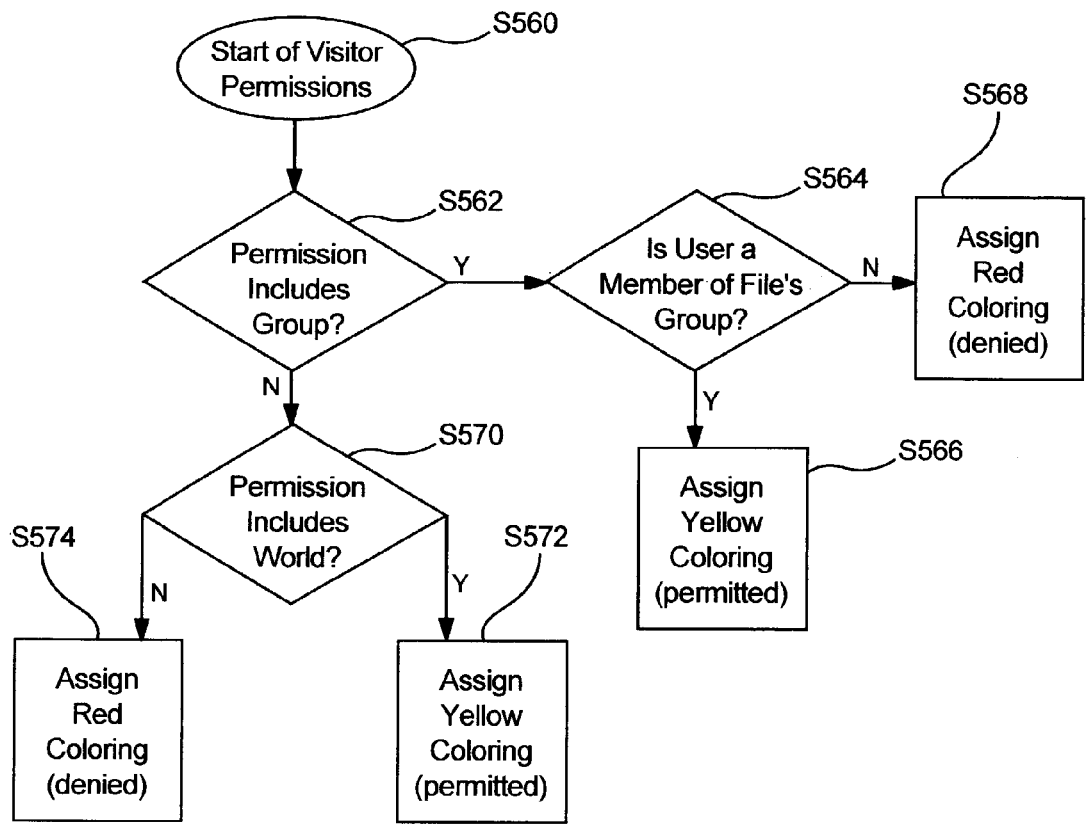

FIG. 6D shows a subroutine for applying a visitor permission scheme of colors to the icon(s)/textual name(s) associated with files not owned by the user or of which the user is not of superuser status. At step S560, the visitor permission subroutine begins. At step S562, a determination is made as to whether a group permission is assigned to the file. If a group permission has been assigned, then a determination is made at step S564 as to whether the current user is a member of any group that the file has group permission for. If the user is a group member, then the color yellow is assigned at step S566, indicating that the current user is permitted access to the file. If the user is not a member of any permitted group, then the color red is assigned at step S568, indicating that the current user cannot access that file. If no group permission status exists at step S562, a further determination is made at step S570, as to whether world permission is given. If world permission is given, then the yellow color is assigned at step S572, indicating that access is permitted to the current user. If world permission is not on at step S570, then the red color is assigned at step S574 to indicate that the current user is denied access.

The present invention may also be used to assign colors to icons 200 and/or filenames 180 to illustrate the "age" of the file, that is, how long it has been since the file was last accessed or read, when it was last edited or written to (write date) and when it attributes were changed (referred to as the header date). The process of "age coloring" the icons and/or file names allows the user to instantly see which files have been recently read or modified, as well as the amount of time that the file has existed for. This information can be very useful to a programmer, who could use it to easily determine what files have been recently modified and/or what files were affected by changes made to another file. Additionally, a system administrator could easily and readily determine if a hacker or otherwise unauthorized access was made to secure files. For example, a system administrator could monitor the LAN for outside attacks from hackers to determine if sensitive files such as password logs have been accessed.

Age coloring overcomes some of the problems associated with misinterpreting textual dates. For example, "Jan" may be mistaken for "Jun" or "Jul", but with respect to August 1, these ages are very distinctly different and would be widely separated by a color scheme according to the present invention and therefore readily distinguishable.

One age-coloring scheme of the present invention uses coloring of the perimeter or outside portion of an icon 200 to indicate the time at which the file was last read, and thus how "old" the last reading of the file currently is; coloring of the interior of the icon 200 to indicate the time at which the file was last written to and thus how "old" the current version of the file is, and coloring of the file name 180 associated with the icon 200 to indicate the attribute change time, and thus how old the file is from the time of attribute change.

Figure 7B:
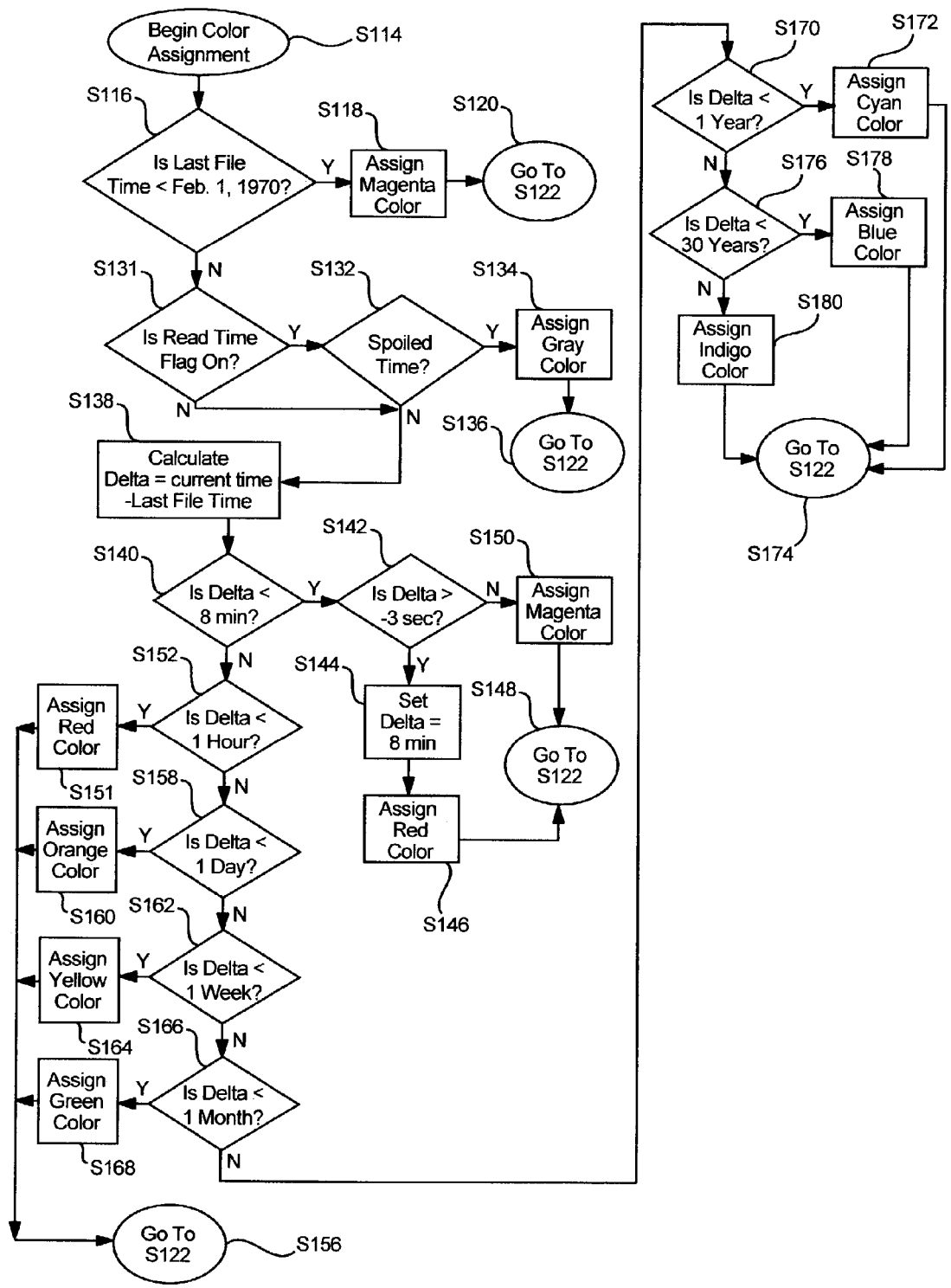
Figure 7C:
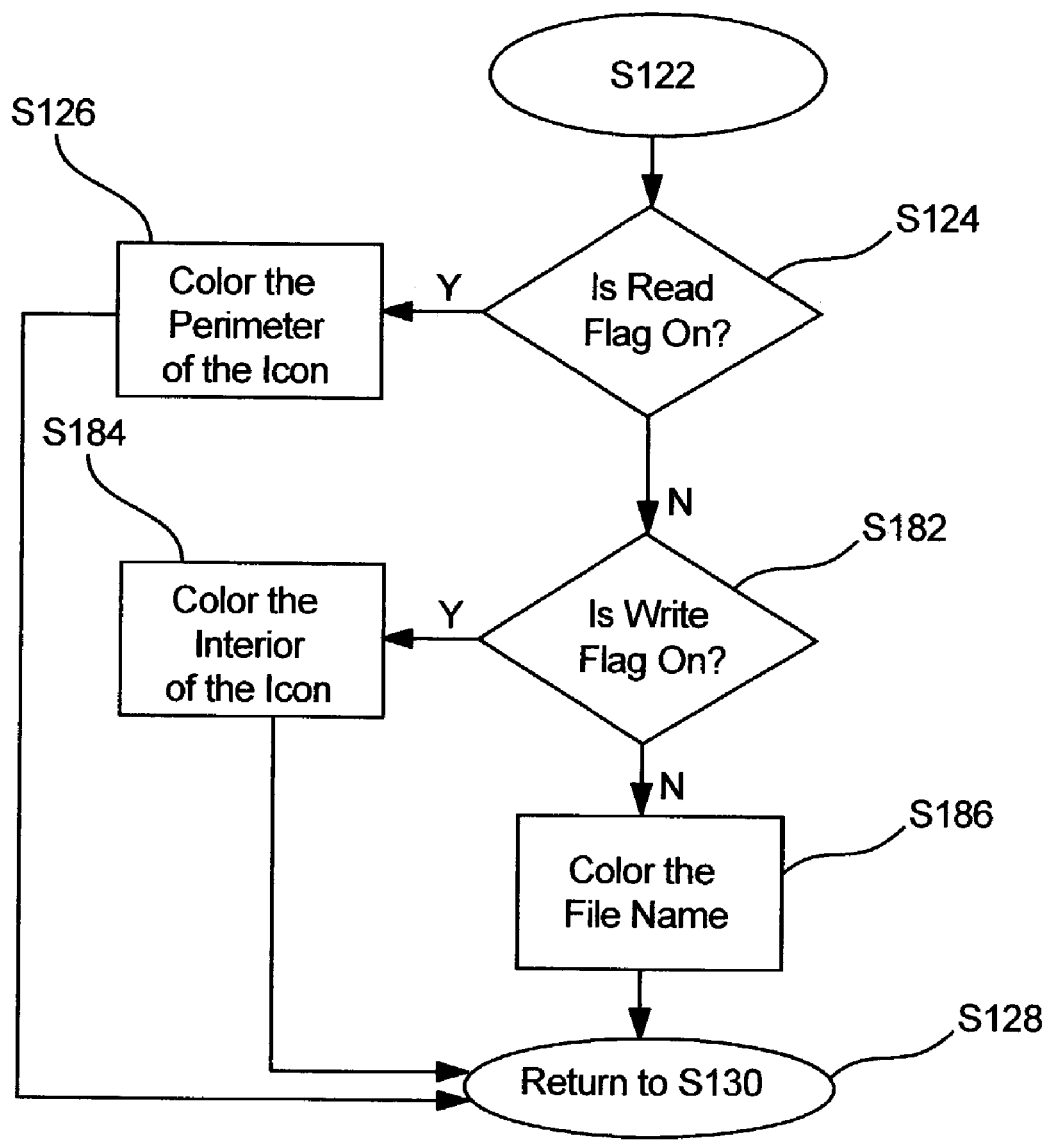

FIGS. 7A–7C diagrammatically illustrate an example of a process by which the present invention assigns color-coding to icons 200 and file names 180 to indicate age statuses of the files associated with such icons 200 and file names 180. The process begins at step S100 where the file attributes regarding times that the file was last accessed (read), edited (written to) and the time that the file was originally entered onto the system are read, as a basis for color-encoding the components to graphically display the age statuses on the GUI. At step S102 it is determined whether the system has already assigned a color to the "read age" status of the file. The read age status will graphically indicate the amount of time that has passed since this particular file was last read, relative to the amounts of time that have passed since for all other files displayed have been read. If read age status has not yet been color-encoded, the process is instructed at S104 to turn on a flag that read time processing is proceeding and to proceed to step S114. At step S114, the color assignment process begins and at step S26, it is determined whether the last read time was prior to Feb. 1, 1970 (or some other predetermined date determined to predate the header dates of substantially all computer files). If the read time listed is before Feb. 1, 1970, then this is an erroneous recordation of the read time, since virtually all files existing today were not created before Feb. 1, 1970. This commonly happens when a computer's clock loses power and resets to zero, which is Jan. 1, 1970. In such an instance, files will be time-stamped erroneously until the clock is set correctly. Accordingly, the color magenta is assigned at step S118 to indicate that an error has occurred. The process is then directed to S122 at step S120. At step S122, the process goes to step S124 where it is determined whether the read time flag is on. In this instance the read time flag is on, and so The magenta color is applied to the perimeter of the icon 120, the read time flag is turned off, the read time processing complete flag is turned on, and the process is directed to return to step S130 at step S128. Going back to step S116 in the process described above, if the last read time date is equal to or after Feb. 1, 1970, then processing advances to step S131 where it is determined whether or not the read time flag is on. If the read time flag is on, then processing goes to step S132, where it is determined whether there is spoiled time. The read time is determined to be spoiled time if the access date (time) is within about a minute or two (or some other predetermined small increment of time) of the current time at which the determination is being made. Since many files and directories may be searched or otherwise "accessed" when a normal process of a file manager or other computer program is running, even without the user's knowledge, then the read time in this situation is meaningless, since only the machine accessed the file, not a user. Thus, if it is determined that there is spoiled time at step S132, then the color gray is assigned at step S134 and processing continues to step S122 at step S136, after which processing continues in a similar manner described above, so as to apply the color gray to the perimeter of the icon 200.

Assuming that no spoiled time was determined at step S132, or if the read time flag is not on at step S131, processing continues to step S138, where a "delta" is calculated. The delta is defined as the difference between the present time of processing, and the last file time, in this case, the last time that the file was read. After calculating delta, step S140 determines whether delta is less than a small preset time interval, e.g., 8 minutes. If delta is less than 8 minutes, it is further determined at step S142 if delta is less greater than −3 seconds, or some other predetermined small time period that can be employed to account for timing variations between various programs and software. If delta is determined to be greater than −3 seconds, then the system assumes that this delta is due to timing differences among programs, and sets the value of delta to eight minutes (or some other small, preset time interval, as noted above) at step S144. At step S146, the color red is assigned, which is an intuitive color for "hot" or "red hot" which helps the user to grasp the concept that the age of the read time is very small or nonexistent. Processing then goes to step S122 via step S148 and continues on as described earlier to apply the color red to the perimeter of the icon 200. If the delta is determined to be less than or equal to the predetermined time (e.g., −3 sec), then the system determines that an error has occurred, since this means that the last reading of the file occurred some time in the future. This type of occurrence can be due to a mis-set clock or a time zone misinterpretation. Thus, the color magenta is assigned at step S150. Processing then goes to step S122 via step S148 and continues on as described earlier to apply the color magenta to the perimeter of the icon 200.

Referring back to step S140 in the above-described process, if delta is determined to be greater than or equal to eight minutes, processing goes to step S152 to determine whether delta is less than one hour. If delta is less than one hour, then the color red is assigned at step S154, and processing continues to step S122 via step S156 and continues on as described earlier to apply the color red to the perimeter of the icon 200.

If delta is found to be greater than or equal to one hour at step S152, processing goes to step S158 to determine whether delta is less than one day. If delta is less than one day, then the color orange is assigned at step S160, and processing continues to step S122 via step S156 and continues on as described earlier to apply the color orange to the perimeter of the icon 200.

If delta is found to be greater than or equal to one day at step S158, processing goes to step S162 to determine whether delta is less than one week. If delta is less than one week, then the color yellow is assigned at step S164, and processing continues to step S122 via step S156 and continues on as described earlier to apply the color yellow to the perimeter of the icon 200.

If delta is found to be greater than or equal to one week at step S162, processing goes to step S166 to determine whether delta is less than one month. If delta is less than one month, then the color green is assigned at step S168, and processing continues to step S122 via step S156 and continues on as described earlier to apply the color green to the perimeter of the icon 200.

If delta is found to be greater than or equal to one month at step S166, processing goes to step S170 to determine whether delta is less than one year. If delta is less than one year, then the color cyan is assigned at step S172, and processing continues to step S122 via step S174 and continues on as described earlier to apply the color cyan to the perimeter of the icon 200.

If delta is found to be greater than or equal to one year at step S170, processing goes to step S176 to determine whether delta is less than thirty years. If delta is less than thirty years, then the color blue is assigned at step S178, and processing continues to step S122 via step S174 and continues on as described earlier to apply the color blue to the perimeter of the icon 200.

If delta is found to be greater than or equal to thirty years at step S176, processing goes to step S180, where the color indigo is assigned. Processing then continues to step S122 via step S174 and continues on as described earlier to apply the color indigo to the perimeter of the icon 200.

After coloring the perimeter of the icon with any of the colors according to the process steps described above, the read time flag is turned off, a read time processing complete flag is turned on, and processing is returned to step S130 via step S128. At step S130 processing is directed to step S102, where it is determined that read time color has been encoded, by recognition of the read time processing completed flag being on. Processing then advances to step S106 where it is determined that the last write time has not yet been processed and color-encoded, since a "write time processing completed" flag is not on in this instance. The process then goes to step S108, where a flag for "write time" is turned on and the processing is directed to step S114. Color assignment processing for write time goes on in the same manner as described above with regard to read time color processing, except that this time the file attributes with regard to write times are compared and considered in the processing steps. After assignment of a color along any of the previously described paths, it will be determined at step S124, in this instance, that the read time flag has been turned off. At step S182, when it is determined that the write time flag has been turned on, processing then goes to step S184, where the assigned color is applied to the interior of the icon to indicate the status of write time. The "write time processing completed" flag is turned on and the write time flag is turned off.

Again returning to step S102 via steps S128 and S130, it is again determined at step S102, that read time has been assigned a color, by the presence of the read time processing completed flag. Moving to step S106, it is also determined that write time has been assigned a color, by the presence of the write time processing completed flag. Processing then goes to step S110 where it is determined that the cdate color processing has not yet been accomplished. Processing then goes to step S112, where a cdate time flag is turned on, and then processing goes to step S114 for color assignment. Color assignment processing for cdate time goes on in the same manner as described above with regard to-read and write times color processing, except that this time the file attributes with regard to the header dates of the files are compared and considered in the processing steps. After assignment of a color along any of the previously described paths, it will be determined at step S124, in this instance, that the read time flag has been turned off, and at step S182 that the write time flag has been turned off. Processing then proceeds to step S186, where the assigned color is applied to the file name associated with the icon to indicate the status of the cdate age. A "cdate processing time completed" flag is turned on and the cdate time flag is turned off, after which processing returns to step S102 via steps S128 and S130. After determination that each of read, write and cdate times coloring has been performed at steps S102, S106 and S110, respectively, all flags are reset (turned off) and the processing ends for that particular file (step S188). The same procedures are repeated for each icon and file name to be color encoded.

By this process, the present invention provides a visual display on a GUI which readily identifies read, write and cdate age statuses of the files displayed to a user, without having to resort to the opening of any further files, envelopes or without further processing of the icons. The user can immediately identify which files have been changed or read relatively recently, which files have been just created, etc. Similarly, an owner or administrator (superuser) can visualize which files have been most recently accessed, created or altered by their red coloring in the appropriate locations, which is very easily and readily perceived.

It should be noted that, like the coloring with regard to permissions, the particular color assignments and locations of the color assignments are not to be considered as limitations of the present invention, as both may be varied. For example, the cdate could be indicated by the perimeter color of the icon 200, or a file which was created less than a minute ago could be identified by some color other than red. Nor do the divisions in coloring of the icon limit the invention, as the icon could be differentially colored between the top half and bottom half, for example, to indicate different age statuses. Although the color assignments have been chosen according to what the inventor believes is an intuitive scheme, certainly other color assignments could be made, so long as they are readily visually differentiable from one another.

Figure 7D:
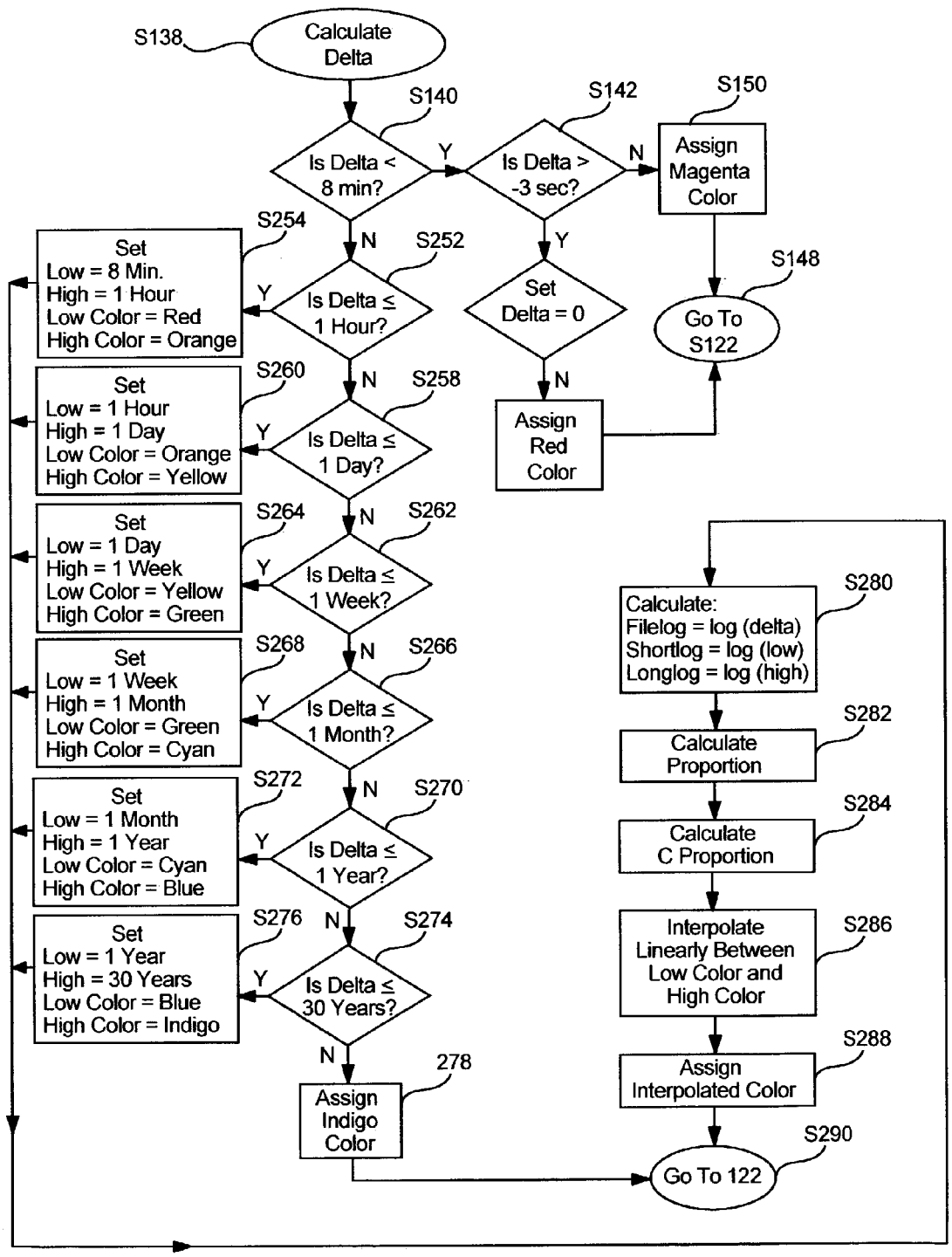

FIG. 7D diagrammatically illustrates an alternate scheme for determining colors to be used for color-encoding icons 200 and file names 180 to represent age. Once the colors are determined by this scheme, they are applied to the icons 200 and filenames 180 in the same manner as described above with regard to FIGS. 7A–7C. The rules and procedures for assignment of the gray color and the magenta color are also the same as described above with regard to FIGS. 7A–7C. The steps which are shown in the diagram of FIG. 7D which have already been described with regard to FIGS. 7A–7C are not repeated here. After calculation of delta at step S138 in the manner described above, if delta is not less than eight minutes at step S140, then a determination is made at step S152 as to whether delta is less than or equal to one hour. If delta is less than or equal to one hour, then a low value of 8 minutes and a high value of one hour are set at step S254, and a low color is set as red and high color is set to orange.

If delta is greater than one hour, then a determination is made at step S258 as to whether delta is less than or equal to one day. If delta is less than or equal to one day, then a low value of one hour and a high value of one day are set at step S260, and a low color is set as orange and high color is set to yellow.

If delta is greater than one day, then a determination is made at step S262 as to whether delta is less than or equal to one week. If delta is less than or equal to one week, then a low value of one day and a high value of one week are set at step S264, and a low color is set as yellow and high color is set to green.

If delta is greater than one week, then a determination is made at step S266 as to whether delta is less than or equal to one month. If delta is less than or equal to one month, then a low value of one week and a high value of one month are set at step S268, and a low color is set as green and high color is set to cyan.

If delta is greater than one month, then a determination is made at step S270 as to whether delta is less than or equal to one year. If delta is less than or equal to one year, then a low value of one month and a high value of one year are set at step S272, and a low color is set as cyan and high color is set to blue.

If delta is greater than one year, then a determination is made at step S274 as to whether delta is less than or equal to thirty years. If delta is less than or equal to thirty years, then a low value of one year and a high value of thirty years are set at step S276, and a low color is set as blue and high color is set to indigo.

If delta is greater than thirty years, then the color indigo is assigned and processing continues to step S122 (FIG. 7C) via step S290 for application of the color.

From each of steps S254, S260, S264, S268, S272 and S276, processing continues to step S280, where values for "filelog", "shortlog" and "longlog" are calculated. Filelog is defined simply by the logarithm of the calculated value of delta, i.e., filelog=log(delta). Shortlog is defined by the logarithm of the value for "low" which has been inputted from any of the steps S254, S260, S264, S268, S272 or S276. Longlog is defined by the logarithm of the value for "high" which has been inputted from any of the steps S254, S260, S264, S268, S272 or S276. Logs to any base may be used for these calculations as long consistency is maintained throughout the calculations, and the base used provides sufficient resolution to visually discriminate the variations in color shade that they produce as a result of the calculations. Therefore, natural logs (ln) may be used, base 10 logs (log) or other bases. The present inventor has used 256*(log base 2) (i.e., log base $2^{1/256}$ to make calculations with integers possible (e.g., the log base $2^{1/256}$ of 30 is 1256). The factor of 256 cancels out during a division step in the calculation process.

Proceeding to step S282, a proportion value is calculated, wherein:

proportion=(filelog−shortlog)/(longlog−shortlog).

Next, a complementary proportion (i.e., "cproportion") is calculated in step S284 for use in interpolating between colors which are assigned to the low and high values. The value of cproportion is calculated by the equation:

cproportion=1.0−proportion.

Using the cproportion value, a linear interpolation is performed between the values of low and high at step S286, to arrive at a shade of color that lies between the colors assigned to the low and high values. Each milestone time has a time (e.g., eight minutes or just now, one hour, one day, etc.) and a color assigned to it (e.g., red assigned to eight minutes or just now, orange assigned to one hour, etc.). The colors are defined by red, green and blue values, each ranging from 0–255 (i.e, each by an 8 bit number as is conventional in the computer industry for color generation). The interpretation of the color displayed may be determined by calculating a color value equal to the following sum:

color value=(cproportion*low numbers)+
(proportion*high numbers)

where
  low numbers are the set of three eight bit numbers encoding for the red, blue and green values of the low color; and
  high numbers are the set of three eight bit numbers encoding for the red, blue and green values of the high color.

For example, for a situation where delta is between one week and one month, the low color will be yellow and the high color will be green. If we assume that "proportion" in this case is calculated to be 0.4, then cproportion +0.6. The eight bit numbers encoding for yellow are (255, 255, 0) and the eight bit numbers encoding for green are (0, 255, 0), where the numbers are arranged in an order encoding for red, green and blue. The color value of the delta will then be determined by:
  color value=[(0.6*255), (0.6*255), (0.6*0)]+[(0.4*0), (0.4*255), 0.4*0)], wherein the color value will be determined to be (153, 255, 0), which will encode for a shade somewhere in between yellow and green.

The interpolated color (i.e., color value) is then assigned at step S286 and processing is returned to step S122 via step S290 for application of the color to an icon, portion of an icon or filename.

Alternatively to the approach taken as described with regard to FIGS. 7A–7D, the age-coloring assignments may be processed separately with subrouting for each of perimeter coloring, interior coloring and text coloring, as would be readily apparent to one of ordinary skill in the art of programming after reading the present disclosure. For example, age coloring subroutines could be invoked as follows:

Begin Age Color Coding
  PerimeterColoring=AgeColor (ReadPermission)
  InternalColoring=AgeColor (WriterPermission)
  NameColoring=AgeColor (ExecutePermission)

where each of the perimeter, internal and name coloring processes are invoked by dedicated subroutines for assignment of read permission age colorings, write permission age colorings and execute permission age colorings, respectively.

By the color-encoding schemes described above to represent ages of the files, a user can immediately identify the ages of the files as to read, edit and creating times by the colors displayed on the GUI. In the case of coloring according to the scheme described with regard to FIG. 7D, even files within an identified time range (e.g., those between one hour old and one week old) will be differentially colored with shades varying between the limiting low level and high level colors, and therefore will be distinguishable with respect to one another as to which is older or newer. With use, a user will become familiar enough with the color schemes so that the color-coding is memorized and then files can be immediately interpreted as to age by simply viewing the icons and file names on the GUI.

Figure 8:
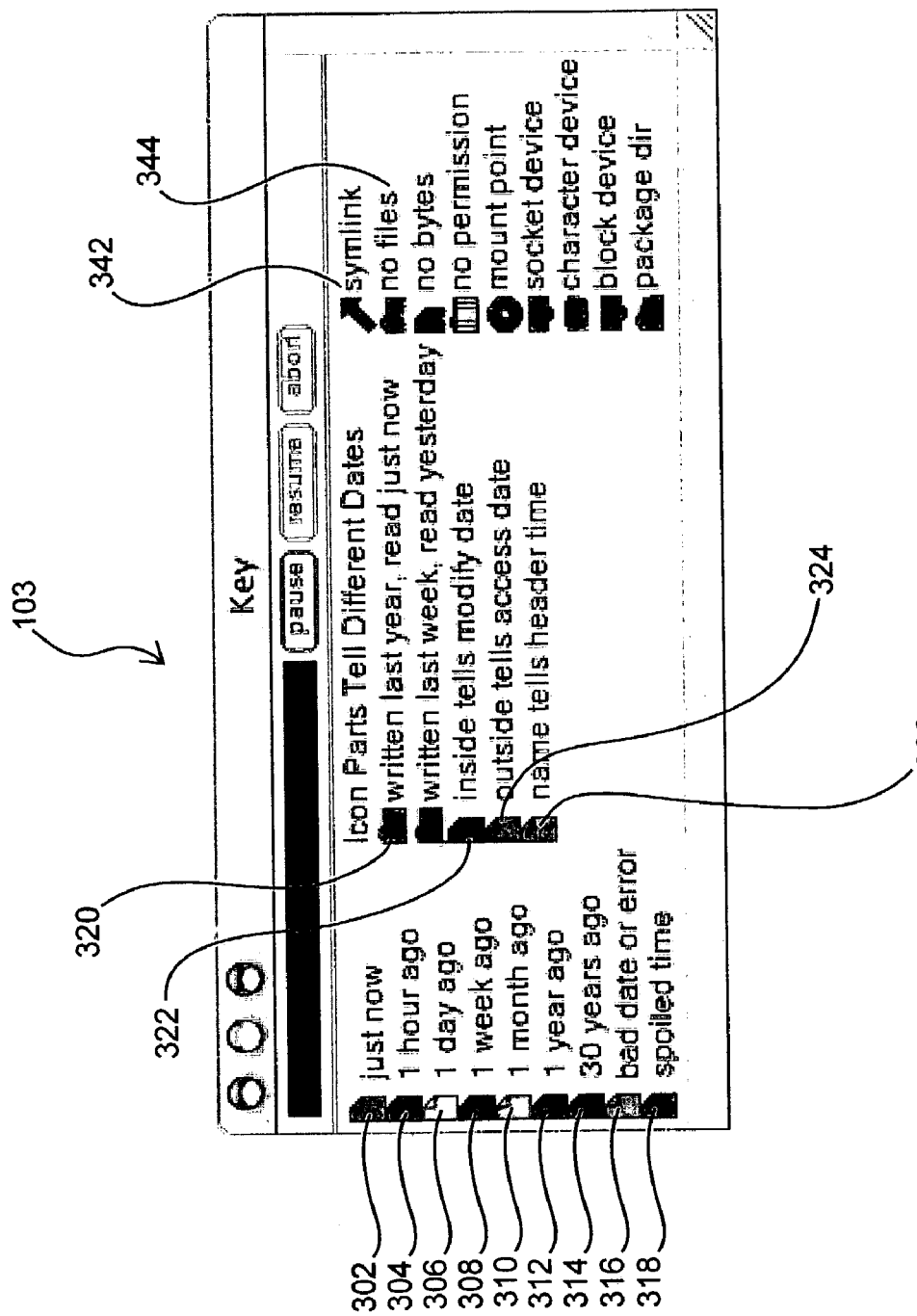
FIG. 8 is a view of a key window that may be accessed to display a key for the color assignments according to the present invention.

However, a key window 103 is also accessible by right clicking or otherwise engaging a selection from a menu on the system. Key window 103 is shown in FIG. 8, and displays a key for the color assignments. The left column of the key window 103 displays icons 302, 304, 306, 308, 310, 312, 314, 316 and 318 in representative colors red, orange, yellow, green, cyan, blue, violet, magenta and gray, respectively. Adjacent the colored icons, are descriptions of the times that the colors represent. For example, the yellow icon 306, is described by one day ago, indicating that yellow encodes for one day. The magenta color 316 encodes for bad date or error, and the gray color 318 encodes for spoiled time.

The middle column displayed in the key window 103 shows examples of the differential coloring schemes and what they signify. For example, icon 320 shows a red perimeter and a blue interior, which encodes for a file that has been read just now (e.g, time is about zero (e.g., eight minutes)), and which was last written to one year ago. Entries 322, 324 and 326 explain that the inside of the icon color-encodes for the time since the last write-to or modify (edit) date, the outside or perimeter of the icon color-encodes for the time since the last read or access date, and the file name color-encodes for the time since the file was originally written or the file was renamed or had a header change.

Keys for other symbols, such as the icon shapes are also defined in the Key window. For example, the icon 342 shows the icon shape for a symlink and icon 344 shows the icon for an empty directory.

Figure 9:
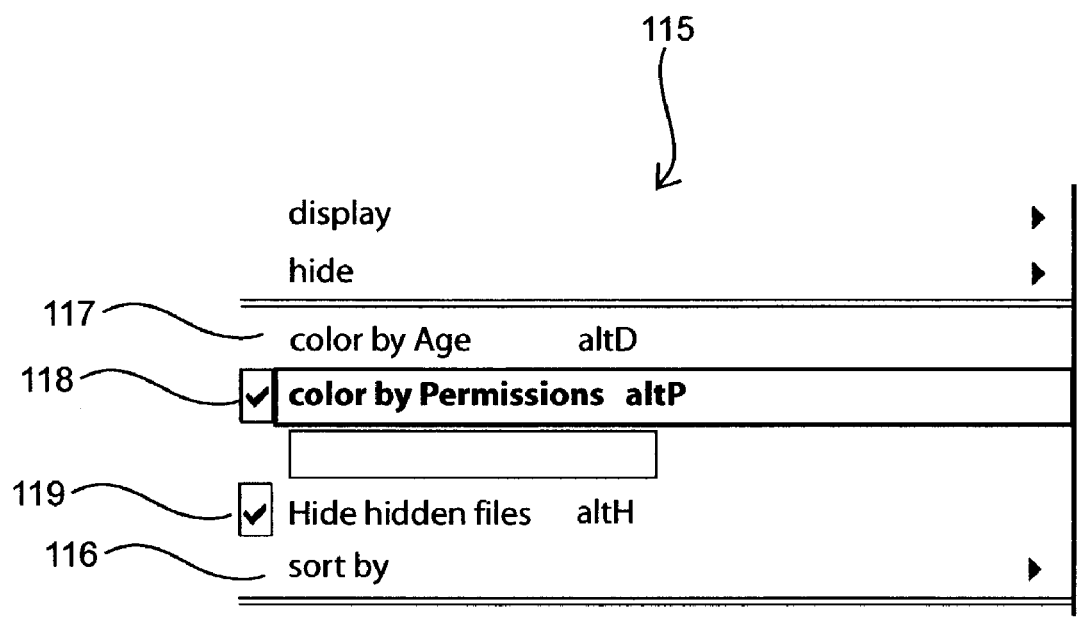
FIG. 9 is a view of a menu which may be accessed to allow a user to choose the file properties to be illustrated by color-encoding, among other functions, according to the present invention.

Referring now to FIG. 9, there is illustrated an exemplary embodiment of a menu 115 which may be accessed by a user by pressing and holding the right mouse button, or through a keyboard or voice command within the window 102. As shown, the menu 115 allows the user to choose the file properties to be illustrated by color-encoding. As shown and described above, color-encoding may be utilized to define the access properties (i.e., permission statuses) of the files. By highlighting the "color by Permissions" entry 118 in the menu 115 and left clicking the mouse or otherwise selecting this entry by a keyboard command (e.g., hitting "Enter"), voice command, or other selection mechanism, the icons 200 and file names 180 the appear on the GUI will be color-encoded according to a permission status color-encoding scheme, such as the one described above. Alternatively, by highlighting the "color by Age" entry 117 in the menu 115 and left clicking the mouse or otherwise selecting this entry, the icons 200 and file names 180 the appear on the GUI will be color-encoded according to an ages status color-encoding scheme, such as by one of the schemes described above.

Additional selections may be made from this window, such as whether or not to display the symbols for hidden files 119, or a sort function may be initiated by selection of item 116, for example.

Icon Shape

Figure 10:
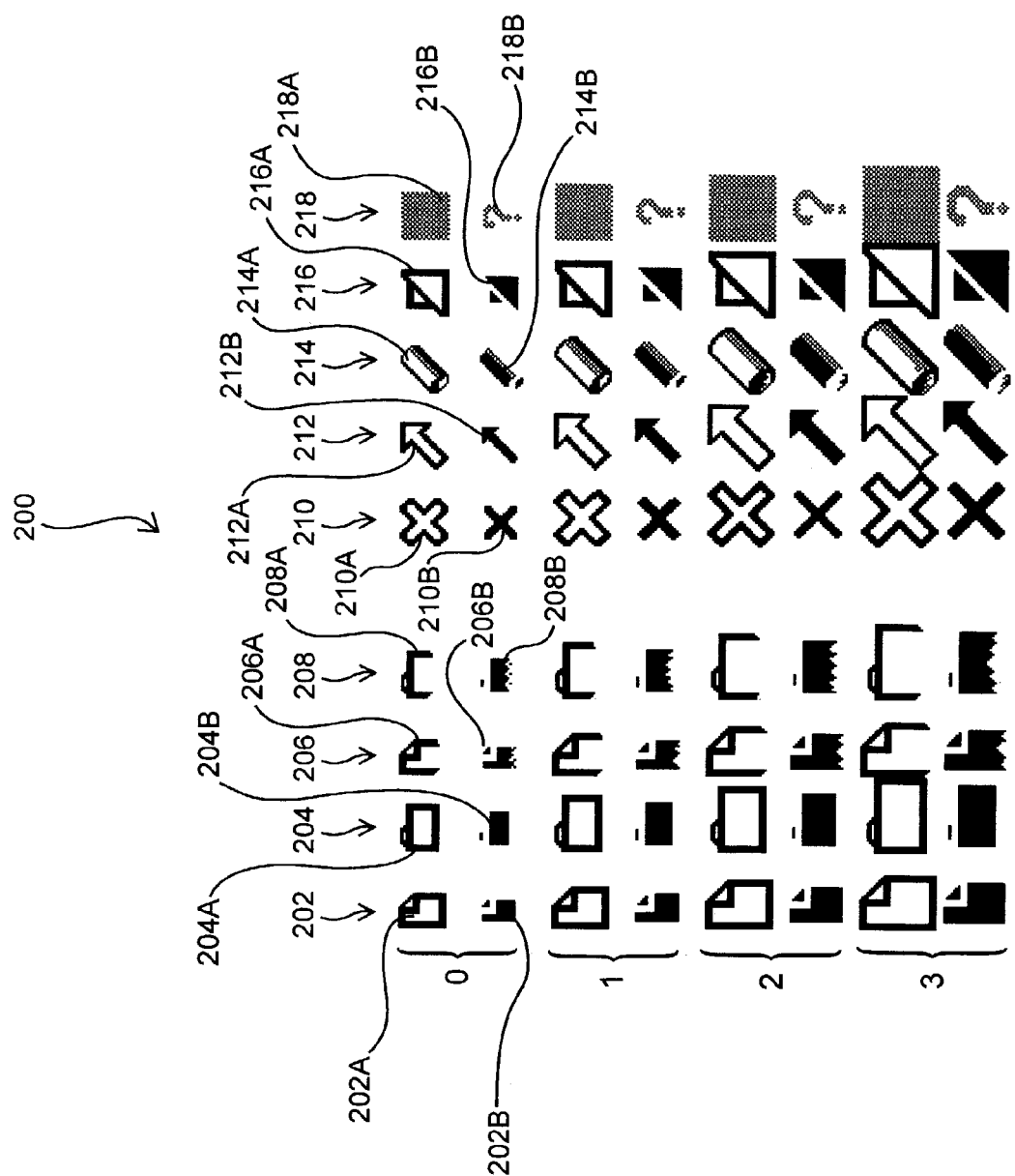
FIG. 10 is shows examples of icon shapes that may be employed by the present invention such that the icons are selected to graphically represent different types of files by the shapes of the icons displayed.

FIG. 10 shows examples of icon shapes that may be employed by the present invention such that the icons 200 are selected to graphically represent different types of files by the shapes of the icons displayed. Each of the icon choices may be constructed from an outer icon portion and an inner icon portion. For example, the icon 202 may be constructed from an outer icon 202*a* and an inner icon 202*b*, the icon 204 may be constructed from an outer icon portion 204*a* and an inner icon portion 204*b*, and the like. The icon shape 202 may be utilized to represent a file, the icon 204 may be utilized to represent a directory or folder, the icon 206 may be used to represent a file that contains no bytes, e.g., an empty file, the icon 208 may be used to represent a directory that contains no bytes or is empty, the icon 210 may be utilized to represent an executable file, the icon 212 may be utilized to represent a symlink, the icon 214 may be utilized to represent a pipe, or a relation to other files or programs, the icon 216 may be utilized to represent hidden files, and the icon 218 may be utilized to represent files that are unknown, such as files that are not associated with an executable file.

Each icon comprises two components as noted above (an inner and an outer icon portion), wherein the icons are saved in a computer readable media having multiple sizes, the purpose of which will be described in greater detail below. The outer and inner icon portions are provided so that each portion may be differentially colored to represent different attributes of the file represented, as described above.

Icon Size

Figure 11:
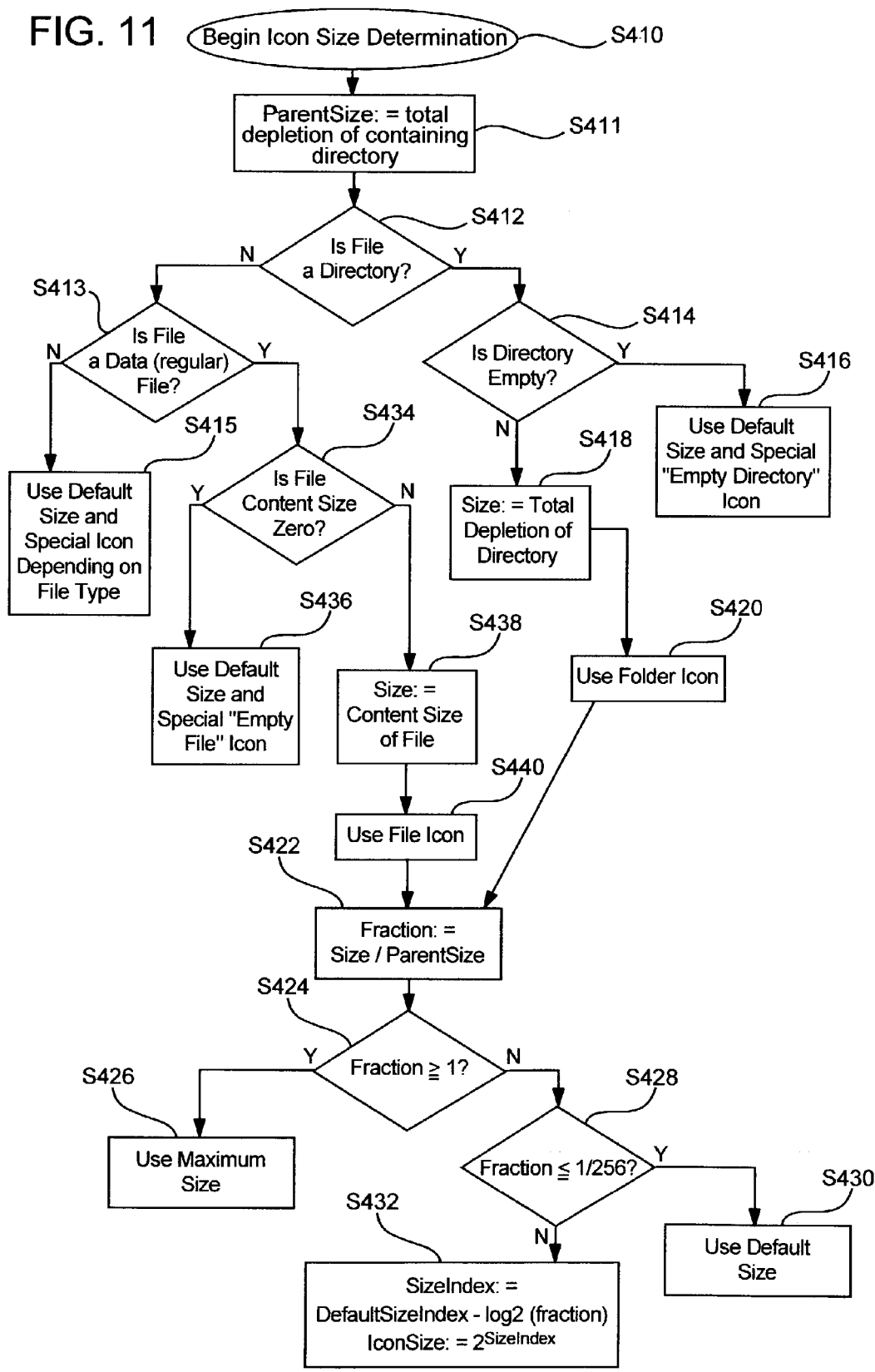
FIG. 11 diagrammatically illustrates an example of a process by which the present invention assigns varying icon sizes to the icons to indicate the relative sizes of the files that they represent.

FIG. 11 diagrammatically illustrates an example of a process by which the present invention assigns varying icon sizes to the icons 200 to indicate the relative sizes of the files that they represent. The process begins at step S410 where the file attributes regarding content and depletion are read by the system. At step S411 the parent size is determined by finding the total depletion of the directory which contains the file being characterized. Advancing to step S412 a determination is made as to whether the file being considered is a directory. If the file is a directory, then a determination is made at step S414 as to whether the directory is empty. If the directory is determined to be empty at step S414, then the empty directory icon 208 is assigned to represent this directory at step S416. The empty directory icon 208 is displayed in the default size, the size which all empty files are displayed in.

If the directory is not found to be empty at step S414, then a value for the directory size is assigned at step S418, where Size=the total depletion of the directory. The directory or folder icon 204 is assigned at step S420 for use to indicate a non-empty directory in this case. The Size of the directory, which was determined in step S418 is next used at step S422 to determine the size of the directory relative to the size of the parent directory which contains the directory. If there is no parent directory, then the size of the entire drive on which the directory is contained is used as the ParentSize. At step S422, a fraction value is calculated, as the ratio of the directory Size, divided by the size of the parent directory (i.e., ParentSize). At step S424, a determination is made as to whether the calculated fraction is greater than or equal to ParentSize. If the calculated fraction is greater than or equal to ParentSize, then the maximum icon size is assigned to this directory at step S426.

If the calculated fraction is less than ParentSize, then a further determination is made at step S428 as to whether the calculated fraction is less than or equal to $1/256$. If the calculated fraction is less than or equal to $1/256$, then the default icon size is assigned (step S430), which is the same size that is assigned to empty files. However, the icon assigned in this instance is different from the empty icon, as noted above. Therefore, it is easy to differentiate the icon for this directory versus one that is used for an empty directory, even though the same icon size is used for both.

If the calculated fraction is greater than $1/256$, then a size index (i.e., SizeIndex) is calculated which will be used to scale the icon representing the directory to the appropriate relative size. Thus, the size of the directory icon will be determined relative to the total depletion of the parent directory in which it is located. The size index is calculated by:

$$\text{SizeIndex} = \text{DefaultSize Index} - \log_2(\text{fraction})$$

Where the DefaultSizeIndex is the index used to create an icon in the default size used for empty directories, files, etc. The default size index is the index number used for the smallest icon that is used in representing a directory. The actual icon size displayed is of a size characterized by:

$$\text{IconSize} = 2^{SizeIndex}$$

However, IconSize does not need to be calculated, since the appropriately sized icon is chosen from a table of icons which is catalogued according to SizeIndex values. As an example, the present invention may employ twelve sizes of icons (e.g., 5, 6, 7, 8, 10, 12, 14, 16, 20, 24, 28 and 32 pixels square, respectively) that are associated with an index of integers ranging from 0 to 11. This forms a substantially exponential progression (i.e., doubling every four indices) resulting in a net power relationship, where the icon size is relative to the file size to a power of k, where k is much less than 1.

By calculating the size index, the system can then select the appropriate size icon to represent the directory, by referring to a look up table that associates the index integers with the icon sizes. As an example, FIG. 10 shows the first four icon sizes (index 0 through 3) of each of the icons shapes available.

Referring back to FIG. 11, step S412, if it is determined that the file is not a directory then it is determined at step S413 whether the file is a data file. If the file is not a data file, the default icon size is applied to this file at step S415, and the appropriate icon is assigned based on the file type, since icon sizes are only modulated for data files and directories. Other files, such as symlinks have no inherent "size" and are depicted in a default size consonant with the text size of the file name associated therewith. If the file is a data file, then a determination is made at step S434 as to whether the content of the file is zero. If the file content is determined to be zero, then the default size is assigned at step S436, and the empty file icon 206 is assigned to be displayed in the default size to represent this empty file. If it is determined that the file size is not zero in step S434, the size of the file (i.e., Size) is determined by the content size of the file (step S438). Then, at step S440, the file icon 202 is assigned at for use to indicate a non-empty file in this case. The Size of the file, which was determined in step S438 is next used at step S422 to determine the size of the file relative to the size of the parent directory which contains the file. At step S422, a fraction value is calculated, as the ratio of the directory Size, divided by the size of the parent directory (i.e., ParentSize). At step S424, a determination is made as to whether the calculated fraction is greater than or equal to ParentSize. If the calculated fraction is greater than or equal to ParentSize, then the maximum icon size is assigned to this directory at step S426.

If the calculated fraction is less than ParentSize, then a further determination is made at step S428 as to whether the calculated fraction is less than or equal to $\frac{1}{256}$. If the calculated fraction is less than or equal to $\frac{1}{256}$, then the default icon size is assigned (step S430), which is the same size that is assigned to empty files. However, the icon assigned in this instance is different from the empty icon, as noted above. Therefore, it is easy to differentiate the icon for this file versus one that is used for an empty file, even though the same icon size is used for both.

If the calculated fraction is greater than $\frac{1}{256}$, then a size index (i.e., SizeIndex) is calculated, which will be used to scale the icon representing the file to the appropriate relative size. Thus, the size of the file icon will be determined relative to the total depletion of the parent directory in which it is located.

The bitmaps of the icons may be stored within the memory of the personal computer, or in another location, such as on a file server connected to the LAN. Various sized icons may be stored in the file as well as various shapes. The icons are saved in a computer readable file, wherein the icons may be saved in twelve sizes on a piecewise linear curve intended to emulate a logarithmic scale as noted above. The default icon size is chosen to resemble the font size that is utilized for the file names. For example, a font with an ascent to descent height of twelve pixels might use the twelve-pixel icon as the default size, wherein no icons below the default size will be utilized.

For simplicity and speed, the icons are drawn as black and white icons, wherein color may be applied over the icon to display additional information as described above.

In accordance with the file management program of the present invention, the type of icon and the size of the icon will always be displayed whether the user chooses the "color by age" or "color by permissions" settings to be displayed. Furthermore, each time a window is opened to display a directory or listing of files stored within memory, the file management program 100 calculates and displays the size of the file(s) and/or directory(ies). When the size of the file or directory cannot be ascertained by the file management program, the file management program may display a banding 220 about the icon. For example, as shown in FIG. 4, the file management program 100 is unable to determine the size of the file 180 "DEV" and therefore displays a gray box 220 about the icon 204.

Figure 12:
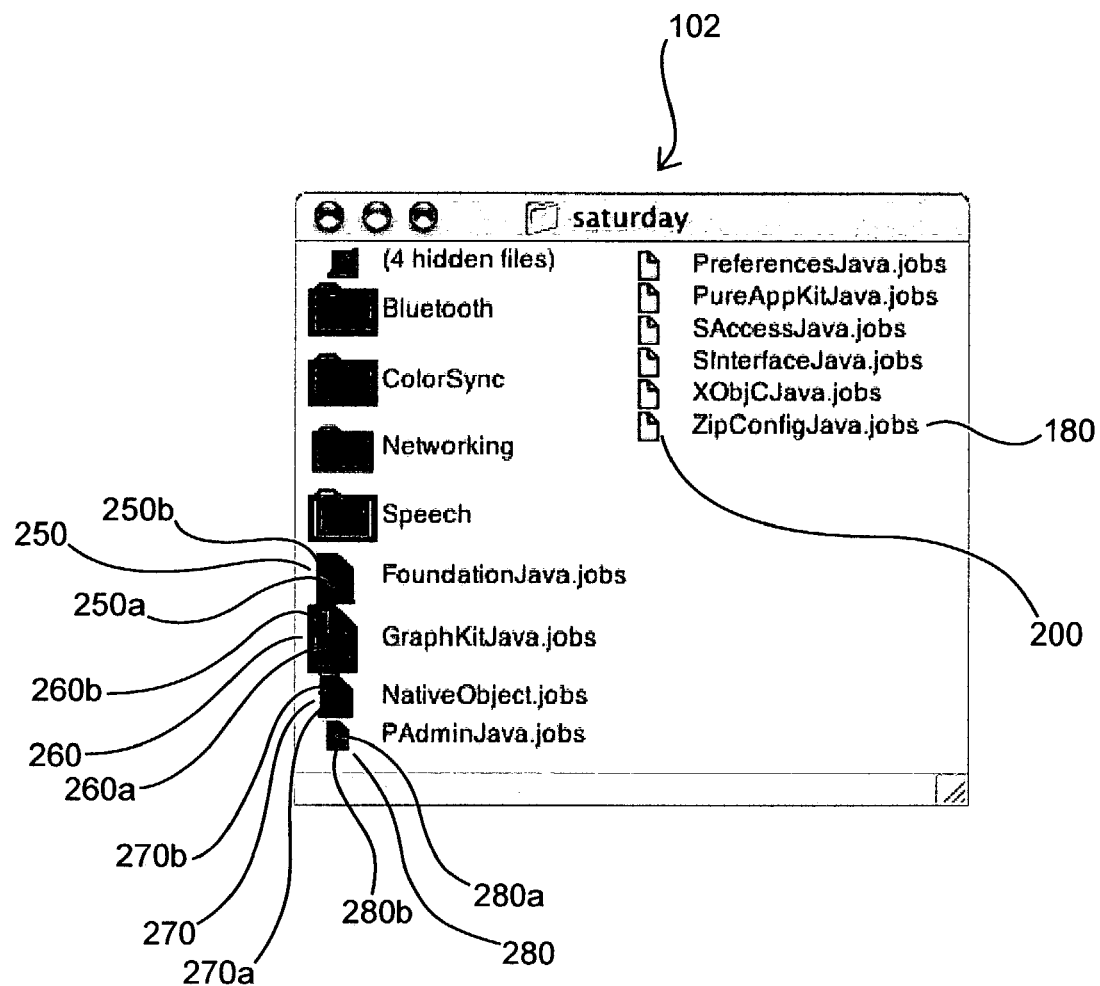
FIG. 12 shows a window having icons and filenames associated therewith, wherein the icons include at least one color to indicate a file permission status attribute, according to the present invention.

Referring now to FIG. 12, there is shown a window 102 having icons 200 and filenames 180 associated therewith, wherein the icons 200 further include at least one color. The user in this instance has chosen to display the icons 200 with the "color by permissions 118" setting. That is, the color of the icons is utilized to represent who may access the files as well as what level of access they may have.

For file permissions, the file management program 100 determines if the person logged onto the system is the owner of the file or a superuser. If the user is the owner of a file, or a superuser, then the permissions color scheme described above for owners will be displayed, whereas, if the user is not an owner or superuser, then the files will be displayed in the yellow and red schema described above for users who are not owners. Additionally, if the user is logged on as a superuser, the background for all windows changes from white to black, and the colors of the icons are lightened somewhat to improve contrast with the changed background. This presents a very obvious display indicating that the status of the user is superuser. At least one color attribute is assigned to each icon 200 and/or file name 180 to visually indicate permissions.

As noted earlier, the icons 200 may include two colors, an outer color surrounding an inner color. Each color is configured to visually convey different information. For example, icon 250 in FIG. 12 is shown having a first color 250a surrounding a second color 250b, wherein the first color (illustrated as green) conveys to the user that this file is read by the world, that is, anyone who may access this file may read its contents. The second color 250b (also illustrated as green) would indicate that this file may also be written to by anyone who may access this file. Referring now to icon 260, icon 260 is shown having a first color 260a surrounding a second color 260b, wherein the first color 260a (illustrated as green) conveys to the user that this file is read by the world, that is, anyone who may access this file may read its contents. The second color 260b (illustrated as blue) would indicate that this file may only be written to by the owner of the file (in the present case, the user who is logged onto the system). Icon 270 is represented by an outer color 270a (illustrated as blue) and an inner color 270b (also illustrated as blue) indicating that this file may only be read and written to by the owner. Icon 280 is represented by an outer color 280a (illustrated as red) and an inner color 280b (also illustrated as red) indicates that this file belongs to another user and cannot be accessed by the current user. Note that, for non-owners, the color scheme indicates only whether access is permitted or denied to that user. The reasons why, and details of who else has access and what those levels of access are, are presumed to be of lesser importance and therefore a distraction. The user can find this information through other means.

Note also that each of the icons 250, 260, 270 and 280 uses the same shape, indicating that they are files, but that the size of file 260 is larger than that of 250 which is larger than that of 270, which is in turn larger than that of 280.

It shall be understood that the colors described above are merely exemplary and should not be considered limiting in any manner. It is contemplated that any color may be utilized to denote any of the properties described above, in that a legend may be utilized to define properties in relation to colors. Further still, it is contemplated that additional colors may be utilized to further convey additional information pertaining to each file. For example, a third color may be utilized to surround the two colors described above, wherein the third color would be utilized to convey another property of the file. Additionally, as shown and described above, choosing the option of "color by permission" does not affect the file management programs ability to display the physical size of the file by adjusting the size and shapes of the icons as described above.

Figure 13:
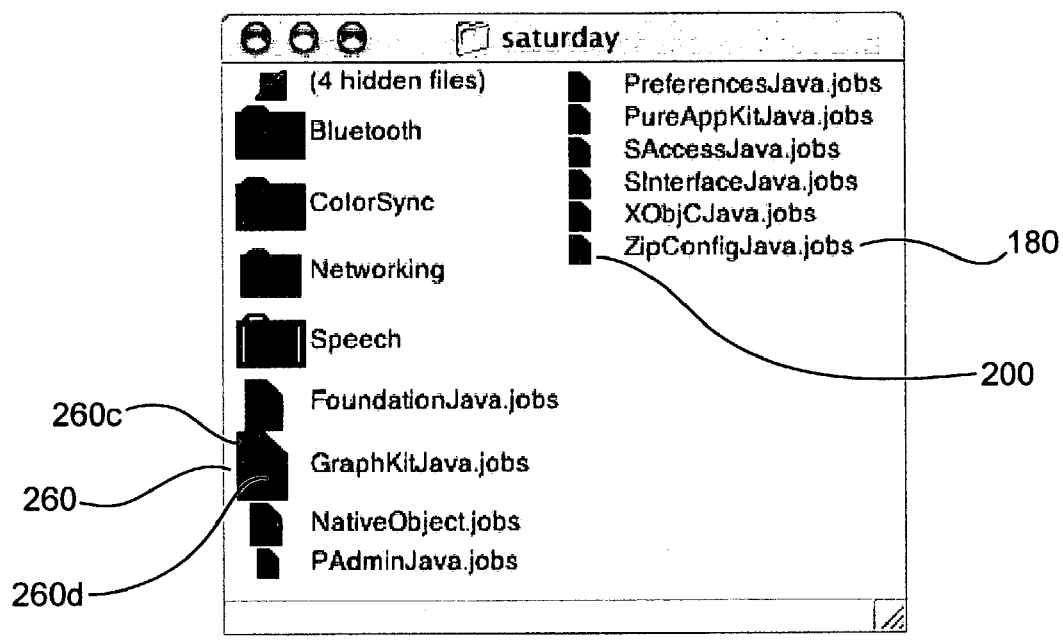
FIG. 13 shows a window having icons and filenames associated therewith, wherein the icons include at least one color to indicate an age status attribute, according to the present invention.

As shown in FIG. 13, the icons 200 may be illustrated having more than one color, wherein each color is utilized to indicate the age of the file. It shall be understood that as utilized herein the term "age of the file" is intended to convey the amount of time that has passed since the file has been last accessed by any user. It shall be understood that this definition shall not be considered limiting in any manner and is merely described herein for exemplary purposes. As shown in FIG. 9, icon 260 is depicted having a first color 260c (illustrated as red) and a second color 260d (illustrated as green) indicating that the file associated with icon 260 has been recently read but has not been written to recently (i.e., within the last week). As utilized herein red is utilized to denote a "hot" file, that is a file that has been most recently accessed, while blue is utilized to denote a "cold" file, that is a file that has not been accessed in a substantial period of time. Note that the relative sizes and shapes of the icons remain the same as they were in FIG. 12, and that only the colors of the icons 200 and file names 180 have changed, as a result of changing the display to color-encode for age.

In accordance with the present invention, the directories and files are organized such that the directories are shown first, followed by the files, wherein the both the directories and files are illustrated in alphabetical order. In addition to illustrating directories and files, the file management program 100 in accordance with the present invention further conveys visually to the user that hidden files exist within this memory location, thus giving the user complete information of all of the files which reside in this memory location. The order in which the files are displayed within any of the windows generated by the file management program 100 in accordance with the present invention may be changed by the user. The user may change the order of the display by selecting a different sort order in a submenu (not shown) which may be accessed by selecting the "sort by" entry in the menu 115 (FIG. 9).

The instant invention is shown and described herein in what is considered to be the most practical, and preferred embodiments. It is recognized, however, that departures may be made there from, which are within the scope of the invention, and that obvious modifications will occur to one skilled in the art upon reading this disclosure. Although the present invention has been described with reference to specific shapes, colors and sizes this shall not be considered limiting in any manner. It is contemplated that one of ordinary skill in the art may undertake modifications to the present invention without departing from the scope of the invention.

What is claimed is:

1. A method for graphically representing properties of files on a computer display, said method comprising:
    determining a first file property of a file to be graphically represented on the display;
    associating a first color assignment with the file, the color assigned being indicative of the first file property that is determined;
    determining at least a second file property of the file to be graphically represented on the display;
    associating a second color assignment with the file, the second color assigned being indicative of the second file property that is determined; and
    displaying at least a portion of at least one of text and graphics on the display in the first color assigned to graphically indicate the first file property to a user and displaying the second color on at least a portion of at least one of the graphics and text to graphically indicate the second file property to the user, wherein the at least one of text and graphics are indicative of the file, the properties of which are being displayed.

2. The method of claim 1, wherein the first file property is selected from file properties comprising permissions and ages of the file.

3. The method of claim 1, wherein the file is a data file, text file, executable file, symlink, directory, sub-directory, folder, linking file or graphics file.

4. The method of claim 2, wherein said permissions properties comprise read permissions, write permissions and execute permissions.

5. The method of claim 2, wherein said ages comprise time since the file was last read, time since the file was last written to and time since the file was created or had the header changed.

6. The method of claim 4, wherein various categories of users are defined relative to said permission properties.

7. The method of claim 6, wherein said various categories comprise owner, group, world.

8. The method of claim 7, wherein a first color is associated with the file property viewed by an owner or superuser and permitted only to the owner or superuser, a second color is associated with the file property viewed by an owner or superuser and permitted only to the owner, superuser and group, and a third color is associated with the file property viewed by an owner or superuser and permitted to the world category.

9. The method of claim 8, wherein a fourth color is associated with the file property viewed by a group member other than an owner or superuser and permitted to the group, and a fifth color is associated with the file property viewed by a group member other than an owner or superuser and not permitted to the group.

10. The method of claim 8, wherein a fourth color is associated with the file property viewed by a world member other than an owner or superuser and permitted to the world, and a fifth color is associated with the file property viewed by a world member other than an owner or superuser and not permitted to the world.

11. The method of claim 9, wherein the fourth color is associated with the file property viewed by a world member other than an owner or superuser and permitted to the world, and the fifth color is associated with the file property viewed by a world member other than an owner or superuser and not permitted to the world.

12. The method of claim 8, wherein a fourth color is associated with the file property viewed by an owner or superuser and not permitted to the owner or superuser.

13. The method of claim 12, wherein a fifth color is associated with the file property when an illogical permission scheme has been assigned.

14. The method of claim 2, wherein a color assignment associated with a file property relative to the age of the file is selected from a plurality of colors, each of the plurality of colors being associated with a different elapsed time interval, and wherein the color assignment associated with the elapsed time interval that is nearest the age to be represented.

15. The method of claim 2, wherein a color assignment associated with a file property relating to the age of the file is derived from two colors selected form a plurality of colors, each of the plurality of colors being associated with a different elapsed time interval, and wherein the color assignment is accomplished by determining two adjacent time intervals wherein the first of the two adjacent time intervals is less than the age and the second of the two adjacent time intervals is greater than the age, and interpolating between first and second colors associated with the first and second adjacent time intervals, based upon the relative time distance of the age from each of the first and second adjacent time intervals.

16. The method of claim 1, wherein the first file property is selected from read permissions, write permissions and execute permissions and the second file property is different from the first file property and is selected from read permissions, write permissions and execute permissions.

17. The method of claim 1, wherein the first file property is an age property selected from time since the file was last read, time since the file was last written to and time since the file was created or had the header changed, and the second file property is an age property different from the first file property and is selected from time since the file was last read, time since the file was last written to and time since the file was created or had the header changed.

18. The method of claim 1, wherein the graphics comprises an icon, the first color is displayed in an inner portion of the icon, and the second color is displayed on an outer portion of the icon.

19. The method of claim 1, wherein the graphics comprises an icon, the first color is displayed on at least a portion of the icon, and the second color is displayed on the text.

20. The method of claim 1, further comprising:
determining at least a third file property of the file to be graphically represented on the display;
associating a third color assignment with the file, the third color assigned being indicative of the third file property that is determined; and
displaying the third color on at least a portion of the graphics or text to graphically indicate the third file property to the user.

21. The method of claim 20, wherein the first file property is selected from read permissions, write permissions and execute permissions, the second file property is different from the first file property and is selected from read permissions, write permissions and execute permissions, and the third file property is different from the first and second file properties and is selected from read permissions, write permissions and execute permissions.

22. The method of claim 20, wherein the first file property is an age property selected from time since the file was last read, time since the file was last written to and time since the file was created or had the header changed, the second file property is an age property different from the first file property and is selected from time since the file was last read, time since the file was last written to and time since the file was created or had the header changed, and the third file property is an age property different from the first and second file properties and is selected from time since the file was last written to and time since the file was created or had the header changed.

23. The method of claim 20, wherein the graphics comprises an icon, the first color is displayed in a first portion of the icon, the second color is displayed in a second portion of the icon and the third color is displayed in at least a portion of the text.

24. The method of claim 23, wherein the first color is displayed in an inner portion of the icon and the second color is displayed on an outer portion of the icon.

25. The method of claim 1, wherein the graphics comprises an icon shaped to graphically represent the particular type of file that the icon is associated with.

26. The method of claim 1, further comprising:
determining at least one of the content and depletion properties of the file;
assigning a size index to the graphics assigned to graphically indicate the relative size of the file; and
displaying the graphics in a size indicated by the size index.

27. The method of claim 26, wherein the size index ranges from a largest size to a smallest size, with the smallest size being assignable to file sizes or depletions of zero up to a predetermined size or depletion; and
the graphics are displayed in a font size of the smallest size when the file size or depletion is substantially zero.

28. The method of claim 26, wherein said size index logarithmically scales the relative sizes in which the graphics are to be represented.

29. A system for graphically representing properties of files on a computer display, said method comprising:
means for determining at least one first file property of a file to be graphically represented on the display;
means for associating at least one color assignment with the file, the color assigned being indicative of the first file property that is determined;
means for determining at least a second file property of the file to be graphically represented on the display;
means for associating a second color assignment with the file, the second color assigned being indicative of the second file property that is determined; and
means for displaying at least a portion of at least one of text and graphics on the display in the color assigned to graphically indicate the first file property to a user, and for displaying the second color on at least a portion of the at least one of graphics and text to graphically indicate the second file property to the user wherein the at least one of text and graphics are indicative of the file the property of which is being displayed.

30. The system of claim 29, wherein the at least one first file property is selected from file properties comprising permissions and ages of the file.

31. The system of claim 29, wherein the file is a data file, text file, executable file, symlink, directory, sub-directory, folder, linking file or graphics file.

32. The system of claim 29, wherein a color assignment associated with a file property relating to the age of the file is selected from a plurality of colors, each of the plurality of colors being associated with a different elapsed time interval, and wherein the color assignment associated is the color associated with the elapsed time interval that is nearest the age to be represented.

33. The system of claim 29, wherein a color assignment associated with a file property relating to the age of the file is derived from two colors selected from a plurality of colors, each of the plurality of colors being associated with a different elapsed time interval, and wherein the color assignment is accomplished by determining two adjacent time intervals wherein the first of the two adjacent time intervals is less than the age and the second of the two adjacent time intervals is greater than the age, and interpolating between first and second colors associated with the first and second adjacent time intervals, based upon the relative time distance of the age from each of the first and second adjacent time intervals.

34. The system of claim 29, wherein the first file property is selected from read permissions, write permissions and execute permissions and the second file property is different from the first file property and is selected from read permissions, write permissions and execute permissions.

35. The system of claim 29, wherein the first file property is an age property selected from time since the file was last read, time since the file was last written to and time since the file was created or had the header changed, and the second file property is an age property different from the first file property and is selected from time since the file was last read, time since the file was last written to and time since the file was created or had the header changed.

36. The system of claim 29, wherein said means for displaying displays the graphics in the form of an icon, the first color is displayed in an inner portion of the icon, and the second color is displayed on an outer portion of the icon.

37. The system of claim 29, wherein said means for displaying displays the graphics in the form of an icon, the first color is displayed on at least a portion of the icon, and the second color is displayed on the text.

38. The system of claim 29, further comprising:
means for determining at least a third file property of the file to be graphically represented on the display;
means for associating a third color assignment with the file, the third color assigned being indicative of the third file property that is determined, wherein said means for displaying displays the third color on at least a portion of the graphics or text to graphically indicate the third file property to the user.

39. The system of claim 38, wherein said means for displaying displays the graphics in the form of an icon, the first color is displayed in a first portion of the icon, the second color is displayed in a second portion of the icon and the third color is displayed in at least a portion of the text.

40. The system of claim 29, further comprising:
means for determining at least one of the content and depletion properties of the file; and
means for assigning a size index to the graphics assigned to graphically indicate the relative size of the file; wherein said means for displaying displays the graphics in a size indicated by the size index.

41. The system of claim 40, wherein the graphics are displayed in a font size the same as the text when the file size or depletion is substantially zero.

42. The system of claim 40, wherein said means for assigning a size index logarithmically scales the relative sizes in which the graphics are to be represented.

43. A computer readable medium carrying one or more sequences of instructions for graphically identifying properties of files, wherein execution of the one or more sequences of instructions by one or more processors causes the one or more processors to perform the steps of:
determining a first file property of a file to be graphically represented on the display;
associating a first color assignment with the file, the color assigned being indicative of the first file property that is determined;
determining at least a second file property of the file to be graphically represented on the display;
associating a second color assignment with the file, the second color assigned being indicative of the second file property that is determined; and
displaying at least a portion of at least one of text and graphics on the display in the first color assigned to graphically indicate the first file property to a user and displaying the second color on at least a portion of at least one of graphics or text to graphically indicate the second file property to the user, wherein the at least one of text and graphics are indicative of the file, the properties of which are being displayed.

44. The computer readable medium of claim 43, the first file property is selected from file properties comprising ages of the file.

45. A method for graphically representing properties of files, directories, subdirectories, symlinks, or folders on a computer display, said method comprising:
determining at least one file property of a file, selected from file properties comprising permissions and ages of the file, to be graphically represented on the display, wherein said permissions properties comprise read permissions, write permissions and execute permissions, and wherein various categories of users are defined relative to said permissions properties;
associating at least one color assignment with the file, the color assigned being indicative of the file property that is determined; and
displaying at least a portion of at least one of text and graphics on the display in the color assigned to graphically indicate the file property to a user, wherein the at least one of text and graphics are indicative of the file the property of which is being displayed;
wherein a various colors are assigned to various and distinct permissions schemes, and wherein an additional, distinct color is associated with the file property when an illogical permission scheme has been assigned.

46. The method of claim 45, wherein said categories of users comprise owner, group and world, wherein a first color is associated with the file property viewed by an owner or superuser and permitted only to the owner or superuser, a second color is associated with the file property viewed by an owner or superuser and permitted only to the owner, superuser and group, a third color is associated with the file property viewed by an owner or superuser and permitted to the world category, a fourth color is associated with the file property viewed by a world member other than an owner or superuser and permitted to the world, and a fifth color is associated with the file property viewed by a world member other than an owner or superuser and not permitted to the world.

47. A method for graphically representing properties of files, directories, sub-directories, symlinks or folders on a computer display, said method comprising:
determining at least one file property defining an age property of a file to be graphically represented on the display;
associating at least one color assignment with the file, the color assigned being indicative of the file property that is determined; and
displaying at least a portion of at least one of text and graphics on the display in the color assigned to graphically indicate the file property to a user, wherein the at least one of text and graphics are indicative of the file the property of which is being displayed.

48. The method of claim 47, wherein said ages comprise time since the file was last read, time since the file was last written to and time since the file was created or had the header changed.

49. The method of claim 47, wherein a color assignment associated with a file property relating to the age of the file is selected from a plurality of colors, each of the plurality of colors being associated with a different elapsed time interval, and wherein the color assignment associated is the color associated with the elapsed time interval that is nearest the age to be represented.

50. The method of claim 47, wherein a color assignment associated with a file property relating to the age of the file is derived from two colors selected from a plurality of colors, each of the plurality of colors being associated with a different elapsed time interval, and wherein the color assignment is accomplished by determining two adjacent time intervals wherein the first of the two adjacent time intervals is less than the age and the second of the two adjacent time intervals is greater than the age, and interpolating between first and second colors associated with the first and second adjacent time intervals, based upon the relative time distance of the age from each of the first and second adjacent time intervals.

51. The method of claim 47, further comprising:
determining at least a second file property of the file to be graphically represented on the display;
associating a second color assignment with the file, the second color assigned being indicative of the second file property that is determined; and
displaying the second color on at least a portion of the graphics or text to graphically indicate the second file property to the user.

52. The method of claim 47, further comprising:
determining at least one of the content and depletion properties of the file;
assigning a size index to the graphics assigned to graphically indicate the relative size of the file; and
displaying the graphics in a size indicated by the size index.

53. A method for graphically representing properties of files, directories sub-directories, symlinks, or folders on a computer display, said method comprising:
determining at least one of content and depletion properties of a file to be graphically represented on the display;
assigning a size from a sizing index scale to graphics assigned to graphically indicate the relative size of the file, wherein the sizing index scale ranges from a largest size to a smallest size, with the smallest size being assignable from file sizes or depletions of zero up to a predetermined size or depletion; and
displaying the graphics in a size indicated by the size assigned from the sizing index scale.

54. The method of claim 53, wherein the graphics displayed for file sizes or depletions that are non-zero but less than the predetermined size are displayed as a first icon of said smallest size, and the graphics displayed for file sizes or depletions that are zero are displayed as a second icon of said smallest size, said second icon being different from said first icon.

55. The method of claim 53, wherein said size index logarithmically scales the relative sizes in which the graphics are to be represented.

56. A method for graphically representing properties of files, directories, subdirectories, symlinks or folders on a computer display, said method comprising:
determining at least one file permissions property of a file to be graphically represented on the display, wherein the at least one file permissions property defines at least one user permitted at least access to the file;
associating at least one color assignment with the file, the color assigned being indicative of the file permissions property that applies to the at least one user; and
displaying at least a portion of at least one of text and graphics on the display in the color assigned to graphically indicate the file property to a user, wherein the at least one of text and graphics are indicative of the file the property of which is being displayed.

57. The method of claim 56, further comprising displaying permissions in effect for a different user.

58. A method for graphically representing properties of files, directories, subdirectories, symlinks or folders on a computer display, said method comprising:
determining at least one file property of a file to be graphically represented on the display, wherein the at least one file property is selected from file properties comprising permissions and ages of the file;
associating at least one color assignment with the file, the color assigned being indicative of the file property that is determined; and
displaying at least a portion of at least one of text and graphics on the display in the color assigned to graphically indicate the file property to a user, wherein the at least one of text and graphics are indicative of the file the property of which is being displayed, wherein a color assignment associated with a file property relative to the age of the file is selected from a plurality of colors, each of the plurality of colors being associated with a different elapsed time interval, and wherein the color assignment associated with the elapsed time interval that is nearest the age to be represented.

59. A system for graphically representing properties of files, directories, sub-directories, symlinks or folders-on a computer display, said method comprising:
means for determining at least one file property of a file to be graphically represented on the display;
means for associating at least one color assignment with the file, the color assigned being indicative of the file property that is determined, wherein a color assignment associated with a file property relating to the age of the file is selected from a plurality of colors, each of the plurality of colors being associated with a different elapsed time interval, and wherein the color assignment associated is the color associated with the elapsed time interval that is nearest the age to be represented; and
means for displaying at least a portion of at least one of text and graphics on the display in the color assigned to graphically indicate the file property to a user, wherein the at least one of text and graphics are indicative of the file the property of which is being displayed.

* * * * *